United States Patent [19]
McCullough et al.

[11] Patent Number: 5,826,069
[45] Date of Patent: Oct. 20, 1998

[54] HAVING WRITE MERGE AND DATA OVERRIDE CAPABILITY FOR A SUPERSCALAR PROCESSING DEVICE

[75] Inventors: Wesley D. McCullough, Aloha; Rohit A. Vidwans, Beaverton, both of Oreg.

[73] Assignee: Intel Corporation, Santa Clara, Calif.

[21] Appl. No.: 127,782

[22] Filed: Sep. 27, 1993

[51] Int. Cl.$^6$ .................................................. G06F 9/00
[52] U.S. Cl. ...................... 395/561; 395/393; 395/800.23
[58] Field of Search ..................................... 395/375, 393, 395/561, 800.23

[56] References Cited

U.S. PATENT DOCUMENTS

| H1291 | 2/1994 | Hinton et al. | 395/800 |
|---|---|---|---|
| 4,805,098 | 2/1989 | Mills, Jr. et al. | 395/250 |
| 5,023,844 | 6/1991 | Arnold et al. | 365/230.05 |
| 5,129,067 | 7/1992 | Johnson | 395/375 |
| 5,136,697 | 8/1992 | Johnson | 395/375 |
| 5,155,817 | 10/1992 | Kishigami et al. | 395/375 |
| 5,185,872 | 2/1993 | Arnold et al. | 395/375 |
| 5,222,240 | 6/1993 | Patel | 395/775 |

OTHER PUBLICATIONS

Smith et al, "Implementing Precise Interrupts in Pipelined Processors", 1988, pp. 562–573.
Johnson, Mike, "Superscalar Microprocessor Design", 1991, chapter 6 Register Dataflow pp. 103–126.
Val Popescu, et al. entitled, "The Metaflow Architecture," IEEE Micro, Jun. 1991, pp. 10–13, 63–73.
Author, Mike Johnson, entitled Superscalar Microprocessor Design, Advanced Micro Devices, Prentice Hall Series in Innovative Technology, 1991, pp. 1–289.

*Primary Examiner*—Parshotam S. Lall
*Assistant Examiner*—Zarni Maung
*Attorney, Agent, or Firm*—Blakely, Sokoloff, Taylor & Zafman

[57] ABSTRACT

A mechanism and method for use in a superscalar microprocessor for storing into a register file within a single clock cycle, the results of multiple instructions (or micro-ops) that become available for storage into the register file at the same instant thus avoiding a microprocessor stall. The present invention may store, during a single clock cycle, results of up to four instructions that become available at the same time and that may target the same register, flag or portion thereof. By storing the results of the instructions (that are executed in parallel) at the same time, the present invention avoids inefficient stalls otherwise associated with prior art microprocessors when to or more instructions (or micro-ops) target the same register, register portion, or flag. The present invention utilizes a special decoder scheme, coupled with merge and priority logic to store the results into the real register file within a single clock cycle. Results of multiple instructions that may target the same register or the same register portion (i.e., data prioritizations are required) or results that target different portions of the same register (i.e., data merges are required) are supplied into the register file during one clock period. The same is true for explicit and implicit flag updates.

56 Claims, 17 Drawing Sheets

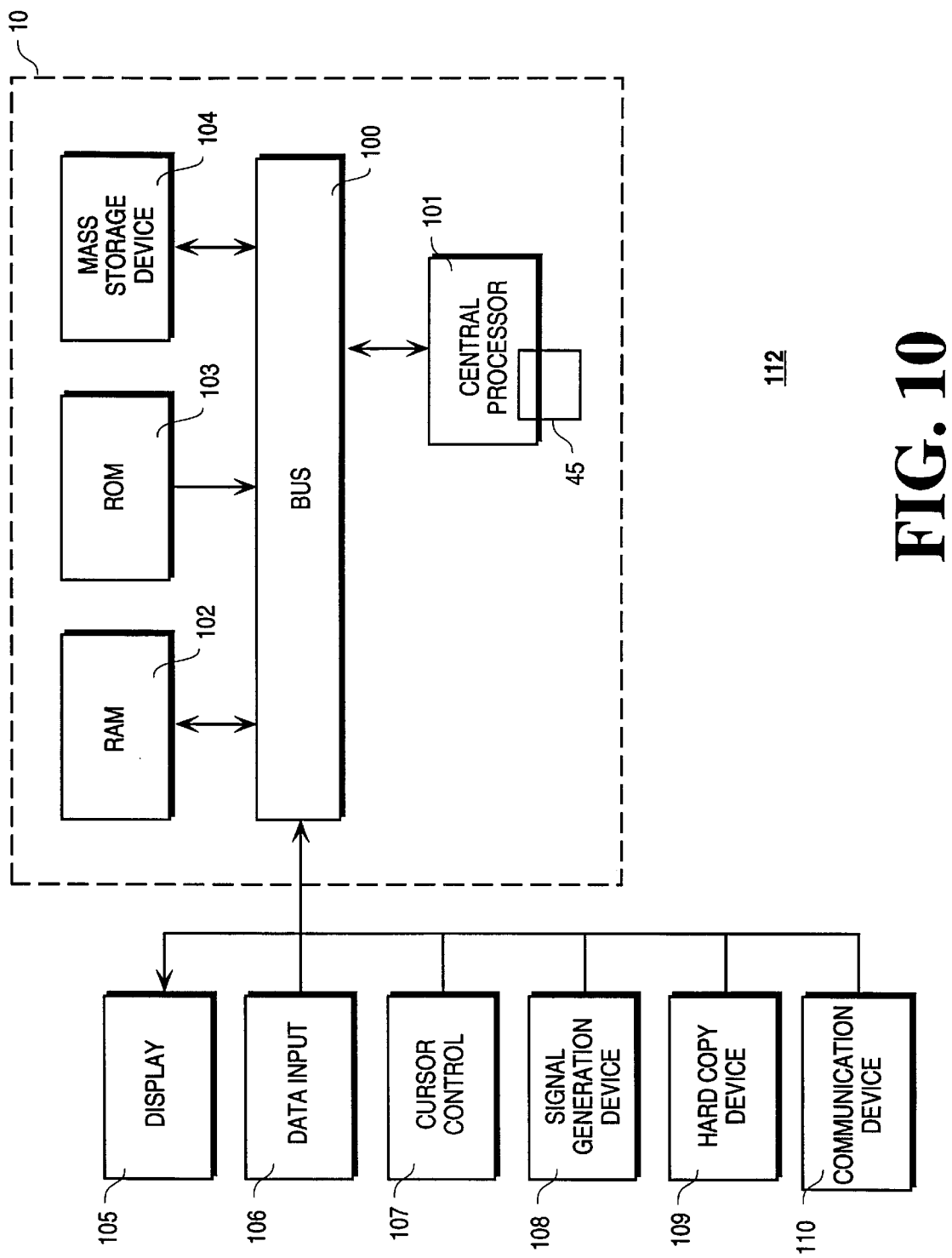

HAVING WRITE MERGE AND DATA OVERRIDE CAPABILITY FOR A SUPERSCALAR PROCESSING DEVICE

BACKGROUND OF THE INVENTION

(1) Field of the Invention

The present invention relates to the field of microprocessor architecture for updating a register file within the microprocessor. Specifically, the present invention relates to the field of updating a register file of a superscalar microprocessor within a limited clock cycle period.

(2) Prior Art

Microprocessors execute instructions that require source registers and destination registers for operand storage. A typical microprocessor instruction may have two source operands stored in two arithmetic registers and the result of the execution (i.e., an addition instruction) will be stored in a third arithmetic register. In addition to the actual result of the instruction, various flags may be updated which correspond to the result of the instruction. For instance, a zero flag may be updated if the result of the executed instruction is zero or an overflow or underflow flag may be set depending on the result stored in the third arithmetic register. The arithmetic registers and flags of the microprocessor as discussed above are placed within a register file within various separate flag registers (i.e., system flag register and floating point flag register). Each flag within a flag register is typically on the order of a single bit in length. It is not uncommon for the flag status register to be combined with the arithmetic registers into a single "register file" or "register buffer." As is appreciated, for each instruction that is executed, different arithmetic registers and flag words will update as the results of the instructions are stored into the register file. Therefore, it is advantageous to provide an efficient and rapid method and apparatus for storing such arithmetic and flag results into the register file. The present invention offers such advantageous capability.

Superscalar microprocessors have the ability to execute more than one instruction at the same time within a given time period. This is allowed because superscalar microprocessors have two or more separate channels (i.e., pipe lines) that can independently execute instructions. Each separate channel uses a separate pipeline. A pipeline comprises the required logic to fetch, decode, prepare, execute, and report results of a given instruction, as an example. A "pipeline" is a term well known to those skilled in the art of microprocessor architecture and therefore will be further discussed below only in relation to understanding aspects of the present invention. Therefore, if multiple pipelines are available within a superscalar microprocessor, multiple instructions may be executed in parallel during the same clock cycles of the microprocessor. The results of these multiple instructions are then available to be written into the register file at the same time (i.e., within the same clock cycle). For instance, if there are two separate pipelines within a given superscalar microprocessor, two instruction results and two sets of flag changes are supplied to the register file at the same time. It is therefore advantageous to provide a mechanism and method for storing the multiple results of a superscalar microprocessor in an efficient manner so as to not delay the remainder of the microprocessor. The present invention offers such advantageous solution.

A prior art microprocessor architecture is illustrated in FIG. 1. Block 51 illustrates that multiple results become available for storage into the register file 53 (which may include flag storage area 55) during a single instruction clock period. These multiple results correspond to the multiple instructions that can be executed in parallel within the prior art superscalar microprocessor. In this example, assume that two instructions may be executed in parallel. As shown by FIG. 1, it may take several clock cycles 57 to completely store the multiple results into the register file 53 or associated flag file 55. In prior art superscalar microprocessor architectures, although multiple results from several instructions may become available for storage into the register file at the same instant, these results may not be written into the register file at the same time. This is because several of the results may be targeted to the same register within the register file. If this is the case, the microprocessor must stall the pipeline while it writes, in sequence, the results targeting the same register.

For example, refer to the pseudo-code instruction stream below whose results become available for storage into the register file within the same clock cycle:

| MOV | 0x011 | EAX | ;Instruction 1 |
| MOV | 0x012 | EAX | ;Instruction 2 |

It is appreciated that within the well known Intel microprocessor architecture ("Intel architecture) instruction set common to microprocessors supplied by Intel Corporation, Santa Clara, Calif., the EAX register designates a 32-bit arithmetic register. Similar to EAX there exists AX which designates a 16-bit register (i.e., the lower bits of EAX) and AH which designates an 8-bit register (i.e., the upper eight bits of AX) and AL which designates an 8-bit register (i.e., the lower eight bits of AX). The same is true for registers such as EBX, ECX, and EDX. Other registers pertinent for discussion will be covered later. Since both instructions (or micro-ops) target the register, EAX, for storage they may not both be loaded into the register file 53 at the same time. Prior art microprocessor architecture requires that first instruction 1 load EAX, then on a subsequent but separate clock cycle, instruction 2 load EAX. During the second load operation into EAX for instruction 2, the front end of the pipelines of the prior art microprocessor must be stalled during the additional clock cycle. This stall represents lost or wasted execution time for the microprocessor and it is advantageous to avoid such wasted execution time.

It is appreciated that a stall would also be required within the prior art system if two or more instructions targeted different sizes or "portions" of the same register (i.e., one register targets EAX but the next targets AX). Or, similarly, if both instructions target the same flag to update (i.e., both update the zero flag) then a stall is required. Therefore, it would be advantageous to provide an efficient mechanism and method for writing multiple results into a register file without requiring a stall when two or more instructions (or micro-ops) target the same arithmetic register, flag or portion thereof. The present invention offers such advantageous result.

Accordingly, it is an object of the present invention to provide a mechanism and method to improve execution efficiency of superscalar microprocessors. It is an object of the present invention to provide an efficient and rapid method and mechanism for storing multiple results into a register file that become available for storage at the same time within a superscalar microprocessor architecture. It is further an object of the present invention to allow a superscalar microprocessor to write multiple results, that become available for storage within a single the same clock cycle, into a register file within one clock cycle. It is yet another object of the present invention to eliminate stalls associated with the prior art microprocessor systems that are caused by superscalar microprocessors when two or more instructions (or micro-ops) target the same register, register portion, or flag and require storage into a register file. It is another object of the present invention to provide a mechanism and method for updating a register file within one clock period for up to four instructions (or micro-ops) whose results become available, at the same time, for storage into the register file. It is also an object of the present invention to provide a general purpose computer system having, as a component, an advantageous superscalar microprocessor as described above. These and other objects of the present invention not specifically mentioned above will become evident from the discussions of the present invention to follow.

SUMMARY OF THE INVENTION

A mechanism and method for use in a superscalar microprocessor for storing into a register file within a single clock cycle, the results of multiple instructions that become available for storage into the register file at the same time thus avoiding a microprocessor stall is described. The present invention may store, during a single clock cycle, results of up to four instructions that become available at the same time and that may target the same register, flag or portion thereof. By storing the results of the instructions (that are executed in parallel) at the same time, the present invention avoids inefficient stalls otherwise associated with prior art microprocessors when two or more instructions (or micro-ops) target the same register, register portion, or flag. The present invention utilizes a special decoder scheme, coupled with data merge and data priority logic to store the results into the real register file within a single clock cycle. Results of multiple instructions that may target the same register or the same register portion (i.e., data prioritizations are required) or results that target different portions of the same register (i.e., data merges are required) are arbitrated and supplied into the register file during one clock period. The same is true for explicit and implicit flag updates.

Specifically, embodiments of the present invention include an apparatus for storing results of an executed set of operations into a register file within one clock cycle, the set of operations executed by a superscalar microprocessor, the register file having a plurality of registers of varying size, the apparatus comprising: merging means for generating separate enable signals corresponding to a first register for individual operations of the set of operations that target a destination register that includes bits of the first register; priority means for generating separate write enable signals corresponding to the first register for individual operations of the set of operations that target the first register, the priority means for asserting a write enable signal corresponding to the first register for a highest priority operation that targets the first register; and enable means for steering data of the results to the first register within the register file for the highest priority operation that targets the first register, the enable means coupled to receive the write enable signals and coupled to the register file. Embodiments of the present invention include the above and further comprising storage means for receiving the set of operations for storage into the register file, the set of operations comprising, for each operation of the set, a flag field; a destination register field; and a data field.

Further embodiments of the present invention include the above and wherein the priority means for generating write enable signals comprises flag priority means for generating write enable signals corresponding to a flag bit of a flag register for individual operations of the set of operations that target the flag bit wherein the individual operations may be explicit write operations or implicit write operations. An embodiment of the present invention includes a superscalar microprocessor which includes the write logic of the present invention. Another embodiment of the present invention includes a general purpose computer system which includes the superscalar microprocessor of the present invention containing the write logic of the present invention.

BRIEF DESCRIPTION OF THE DRAWINGS

FIG. 10 illustrates a computer system embodiment of the present invention including a microprocessor device which utilizes the write merge and override logic embodiment of the present invention.

DETAILED DESCRIPTION OF THE INVENTION

Figure 1:
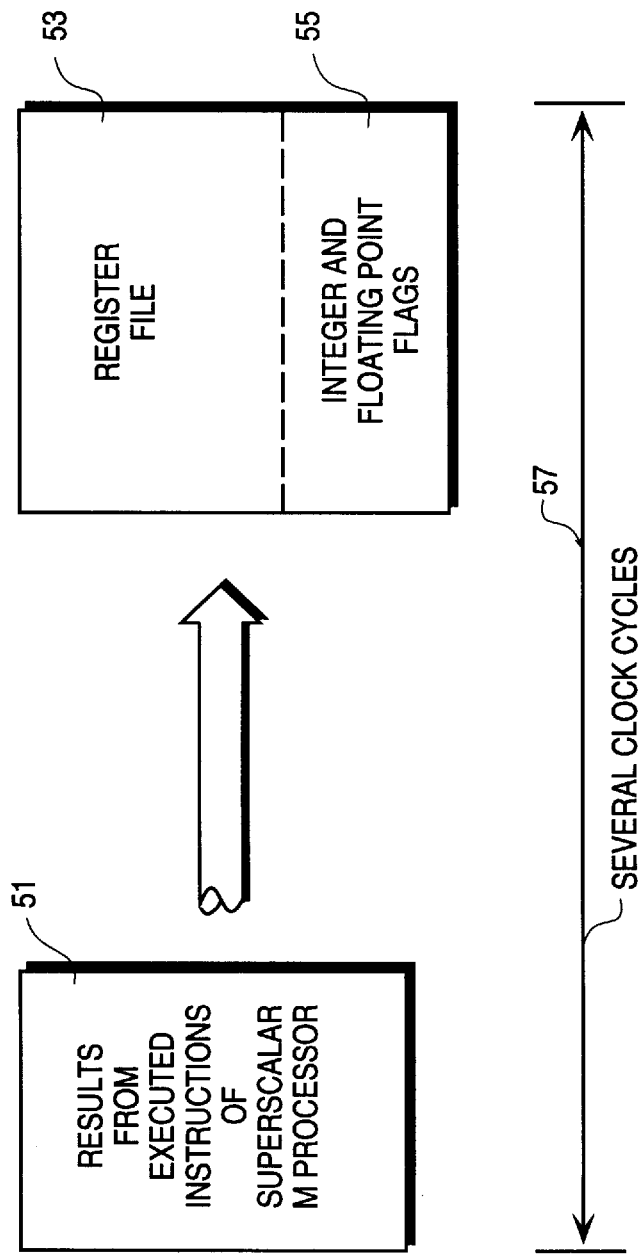
FIG. 1 is an illustration of a prior art register file storage mechanism that sequentially stores results (e.g., by causing a microprocessor stall) that target the same register, flag, or portion thereof.

The present invention includes an apparatus and method for use in a superscalar microprocessor for storing into a register file within a single clock cycle, the results of multiple instructions (or micro-ops) that become available for storage into the register file at the same time thus avoiding a microprocessor stall is described. Within a superscalar microprocessor that may execute, in parallel, up to four instructions at the same time, the present invention is capable of writing the four possible arithmetic results and four possible flag results into the real register file within a single clock cycle whether or not two or more instructions (or micro-ops) of the instructions that produced the results target the same register, flag or portion or part thereof. The real register file (or retirement register file) is that register storage area that is architecturally visible as compared to other register files that are not architecturally visible. The results of a uop will become architecturally visible in the real register file when they are no longer speculative (they are the result of nonspeculative code). When the code is predicted correctly, fully computed data may be updated to the real register file. The present invention utilizes enable logic that is associated with each bit of the storage locations (or byte for arithmetic register data) within the register to steer the appropriate data from the results of the micro-ops. Specialized merge logic is utilized within the enable logic in order to handle cases when two or more micro-ops target different portions of the same register and specialized priority logic is utilized by the present invention to handle cases when two or more micro-ops target the same portion of the same register (or target the same flag).

It is appreciated that flag changes may occur as a result of micro-op execution in one of two fashions. Flag updates may occur implicitly (i.e., as a by-product result of the micro-op) or explicitly by designating the flag register as the destination register for a particular micro-op. Under either case, the present invention contains appropriate merge and prioritization logic to update the flag words accordingly within a single clock cycle. In order to perform the required writes into the register file and flag registers during the same clock cycle, the first in time uops write to a particular register or register portion will never be performed if it will be overwritten by the results of a later in time uop write to that same register or register portion within the same clock cycle. This blocking of the first in time micro-op result is called a "write override" of the present invention. Further, if two micro-ops target different portions or sizes of the same register, they are allowed to write into the register portions concurrently. This concurrent write function is called a "write merge" of the present invention. The present invention allows write override and write merge capability for both arithmetic registers and flag registers.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure the present invention.

Certain terminology is used throughout the discussions of the present invention. Since the present invention may operate advantageously within a superscalar microprocessor, certain terms are used that reference inputs from the remainder of the superscalar microprocessor and reference outputs to the remainder of the superscalar microprocessor according to the present invention write override and write merge logic. The superscalar microprocessor of the present invention is capable of supplying the results of up to four micro-ops, per clock cycle, that have been processed through appropriate execution units and have been thereafter scheduled to have their results written into the register file of the microprocessor. These instructions are called "retiring" instructions because the last phase of the pipeline for these instructions is the write step of their results into the register file and associated flag registers (which may be part of the register file). After the results of these four (or less) "retiring" micro-ops have been written into the register file, these micro-ops then become "retired." It is appreciated that the multiple retiring micro-ops that are presented to the present invention are presented in the order that they were encountered during the program code. In other words, if the previous upstream microprocessor circuitry executed the micro-ops out of order, they are reordered (i.e., by a reorder buffer) before presentation to the present invention write override and write merge logic 45. Therefore, the present invention receives its inputs from a reorder buffer (or "ROB"). Those micro-ops that are retiring for a given clock cycle may be referred to as a retiring set of micro-ops. It is understood that the term micro-op and "uop" are equivalent and refer to the same elements.

It is appreciated, then, that the term "retiring micro-ops" refers to those micro-ops that have been processed to yield results and are presented, at the same time, in program code order to the inputs of the present invention for storage into the register file within one subsequent clock cycle. Once stored, these micro-ops are then "retired micro-ops."

Figure 2:
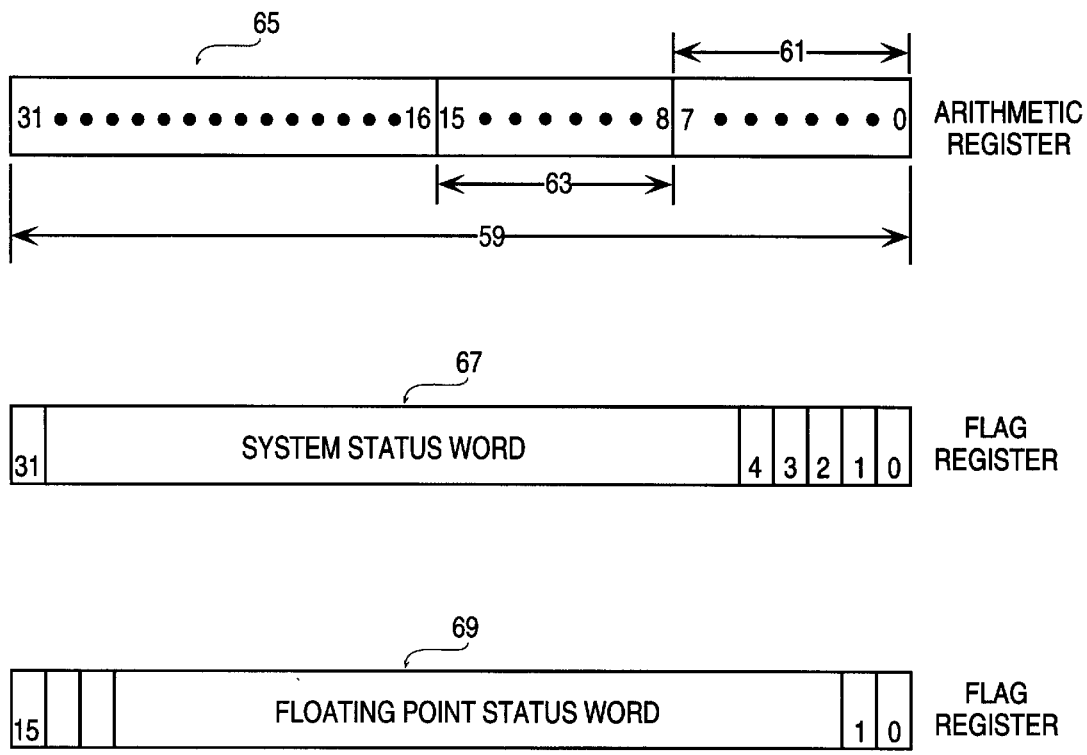
FIG. 2 is an illustration of the present invention's arithmetic register byte configuration (i.e., byte portions) and flag register bit configuration (i.e., bit configuration).

FIG. 2 illustrates the configuration of the arithmetic and flag registers of the register file of the present invention. Within the Intel architecture instruction sets there are several 32-bit arithmetic registers called: EAX, EBX, ECX, EDX, and special purpose 32-bit registers called ESI, EDI, EBP, and ESP for special operations including data transfer operations. There are also several general purpose 16-bit arithmetic registers called AX, BX, CX, and DX including special purpose 16-bit arithmetic registers called BP, SI, DI, and SP. Also, there are general purpose high 8 bit registers called AH, BH, CH, and DH and low 8 bit registers called AL, BL, CL, and DL. It is appreciated that combinations of the above general purpose registers may yield resultant general purpose registers. For example, AX is a combination of AH and AL while EAX is AX with an upper 16-bit word portion. There are also special 16-bit segment registers called CS, SS, DS, ES, FS, and GS which designate the starting location of different segments within memory for use by a program. Along with the above arithmetic registers, the Intel architecture instruction set also contains a 16-bit floating point status word called FSW (or FPU herein) and a 32-bit integer flags register called EFLAGS (or system flags). The EFLAGS register reflects current machine state. There is also a 32-bit instruction pointer called EIP. For more background information regarding the particular registers and flags of the Intel architecture instruction set reference is made to Chapter 2 of the i486 *Microprocessor Programmer's Reference Manual*, published by Osborne-McGraw-Hill, 1990, which is also available directly from Intel Corporation of Santa Clara, Calif. Within the present invention the term "arithmetic" register thus refers to any register within the real register file that is not a flag register.

FIG. 2 illustrates a diagram of the portions of a particular 32-bit arithmetic register 65, for instance EAX. The least significant eight bits 61 are called the AL register. The next most significant eight bit portion 63 is called the AH register. The combination of 61 and 63 is called the AX register. Lastly, the combination of AX with the upper 16 bits (i.e., bits 16 thru 31) is called EAX 59. The same analysis is true for portions of the 32-bit registers EBX, ECX, and EDX. It is appreciated that the bits of the arithmetic registers are byte or word enabled in that bits of entire bytes or words of an arithmetic register may be uniformly written by a particular micro-op result. Thus, a single enable line may control all bits of a given byte (61 or 63) for an arithmetic register. According to the present invention, the arithmetic registers will be written as byte or word units and are not bit addressable. That is, AL will be enabled to received data with a byte enable that enables all bits with AL 61. The AH register will be enabled to received data with a byte enable that enables all bits with AH 63. The AX register is enabled according to the byte enable lines for AH and AL, respectively. The EAX register is enabled according to a word enable line for the upper 16 bits (16 to 31) and the two byte enable lines of AH and AL. Discussions explaining what it means to be "enabled" by the enable lines follows further below.

FIG. 2 also illustrates the 32-bit flag register 67 called the EFLAGS register. Different bits within the flag register 67 correspond to different status indicators. For example, individual bits within the EFLAGs register are called: alignment check, virtual 8086 mode, resume flag, nested flag, I/O privilege level, overflow flag, direction flag, interrupt enable flag, trap flag, sign flag, zero flag, auxiliary carry flag, parity flag, carry flag, etc. These bits may be set or reset implicitly depending on the outcome of individual retiring micro-ops or may be set explicitly by directly writing a value into the EFLAGS register 67. It is appreciated that only certain of the above bits can be set implicitly and the rest can be set explicitly.

It is appreciated that there is also a 16-bit floating point status word, FPU status word 69, which has individual bit flags called: error summary status bit, stack fault bit, and several exception flags called precision bit, underflow bit, overflow bit, zero divide bit, denormalized operand bit, and an invalid operation bit. The FPU status register 69 also contains a top of stack pointer (three bits), an FPU busy bit, and a condition code bit series. It is appreciated that the status summary bit is a function of the above referenced exception bits within the FPU status word 69. If any exception bit is set then the summary bit is set and the summary bit is reset only if none of the exception bits are set. For background information regarding the flags of the well known Intel architecture instruction set, reference is again made to the i486 *Microprocessor Programmer's Reference Manual* discussed above. It is appreciated that the bits of the flag registers are bit enabled in that each bit of the flag registers may be individually set or reset by a particular micro-op result. Therefore, each bit of the flag registers 67 and 69 must contain its own unique enable logic associated with it.

Data Merge and Override Examples

The present invention data merge and override logic functions to input the results of up to four retiring micro-ops and within a half clock cycle write them into the real register file. Since multiple retiring micro-ops may target the same register (EAX) or register portion (AL), specific data merge and override functions must be accomplished which also take into consideration implicit and explicit flag updates. The following examples present selected sets of retiring micro-ops and their results and destination registers to illustrate data merge, data override and implicit and explicit flag updates.

Explicit Data Override. Assume the following set of three micro-ops were retiring and sent to the present invention write logic within a given clock cycle:

| uop0: MOV | EAX, EBX | ;Destination is EAX |
| uop1: ADD | EAX, ECX | ;Destination is EAX |
| uop2: NOP | | |

As shown above, both uop0 and uop1 are writing results into the EAX register. Since they are retiring within the same clock cycle and since uop1 will execute after uop0, the result of uop0 will be overridden by uop1. In such a case, the present invention write logic, because of efficiency, will never actually perform the uop0 write operation to EAX, such a write is not needed since it would have been overwritten anyway by uop1. The write operation for uop0 is overridden by the present invention (i.e., it is ignored). Instead, the present invention writes the result of uop1 into the EAX register of the register file and ignores the write operation to EAX by uop0 in order to reduce processing time and in order to perform the entire write operation within a half clock cycle. In terms of the arbitration of the present invention, uop1 was given priority to write to the EAX register over uop0 which was denied priority.

Explicit Data Merge. Since the Intel architecture has so many unique data sizes, the present invention handles multiple retiring uops to the same register location with different sizes and locations. For example, consider the following set of retiring micro-ops:

| uop0: MOV | AL, CL | ;Destination is AL |
| uop1: MOV | AH, DL | ;Destination is AH |
| uop2: NOP | | |

The above writes to AL and AH do not collide, but rather must be merged to create the AX register value. In such a case, the present invention does not sequentially write AL then AH into the AX register because this would take too much processing time. Rather, the write logic of the present invention arbitrates and determines that for this set of retiring micro-ops, AL and AH may be written at the same time to form the AX register. The data for AL and AH are, in effect, merged together to form the AX register according to the present invention.

Explicit Merge and Override. There are cases when a set of retiring micro-ops will perform both a data merge and a data override. Consider the following retiring set of micro-ops:

| | | | |
|---|---|---|---|
| uop0: MOV | AL, CL | | ;Destination AL |
| uop1: MOV | AH, DL | | ;Destination AH |
| uop2: MOV | AX, BX | | ;Destination AX |

As shown above, the results of uop0 and uop1 may merge to combine the AX register. However, since uop2 (the highest priority uop) also targets the AX register the write operations for uop0 and uop1 will be both overridden by uop2's write to the AX register. In such a case, the data from uop0 and uop1 is never merged in reality, but rather ignored completely by arbitration within the present invention's write logic. The write logic of the present invention determines that the merge of uop0 and uop1 should not be performed since it would have been overwritten by the result of uop2.

Implicit Data Override. Some destinations within the register file are updated implicitly such as arithmetic flags of the EFLAGS register 67 and flags of the floating point status word register 69. Implicit updates to these bits may occur on a bit by bit basis because flag registers 67 and 69 are bit addressable. The present invention handles assignment of write priority to these flag bits in a similar manner to the explicit data override procedure discussed above, except that the problem is further complicated since implicit destinations can also be explicit destinations by other uops that directly write flag masks to the flag registers 67 and 69. Assume the following implicit flag updates (i.e., flag data) are required in view of a set of retiring micro-ops:

| | OF | SF | ZF | AF | PF | CF | |
|---|---|---|---|---|---|---|---|
| uop0 | — | — | S | — | S | S | ;S = SetFlag |
| uop1 | S | — | R | — | S | — | ;R = ResetFlag |
| uop2 | S | — | — | — | R | — | ;— = No change |

For the PF flag, uop2 is determined to be the highest priority uop and the uop1 and uop0 results are overridden. The result is that PF is reset. Uop1 is determined as the highest priority uop for the ZF flag and the uop0 write operation is overridden. The result is that ZF is reset. Uop2 is determined to have the highest priority for the OF flag and the uop1 write operation is overridden. The result is that OF is set. There is no priority conflict with the CF flag and therefore it is set by its high priority uop0.

Implicit/Explicit Data Override. In the following example, the set of retiring micro-ops processed by the present invention includes a micro-op, uop1, that explicitly loads a flag data value into a flag register:

| | OF | SF | ZF | AF | PF | CF | |
|---|---|---|---|---|---|---|---|
| uop0 | — | — | S | — | R | R | ;1 = Explicit "1" |
| uop1 | 1 | 1 | 1 | 1 | 1 | 1 | ;S = Set Flag |
| uop2 | — | — | R | — | R | — | ;R = Reset Flag |
| | | | | | | | ;— = No change |

Uop1 may be realized by a micro-op such as "MOV FLAG, 0x3F." The uop1 has no conflict over the OF, SF and AF flags, therefore as a result these flags are set to "1" explicitly. The uop2 has the highest priority over ZF and uop1 and uop2 writes are overridden; the result is that AF is reset implicitly. The uop2 has the highest priority over PF and uop1 and uop2 writes are overridden; the result is that PF is reset implicitly. The uop1 has the highest priority over CF and uop0's write is overridden; the result is that CF is set to "1" explicitly. If ever a single micro-op within a retiring set updates a flag both explicitly and implicitly within the present invention, then the explicit update commands priority over the implicit update for a given uop.

Overall Block Diagram of the Present Invention

Figure 3A:
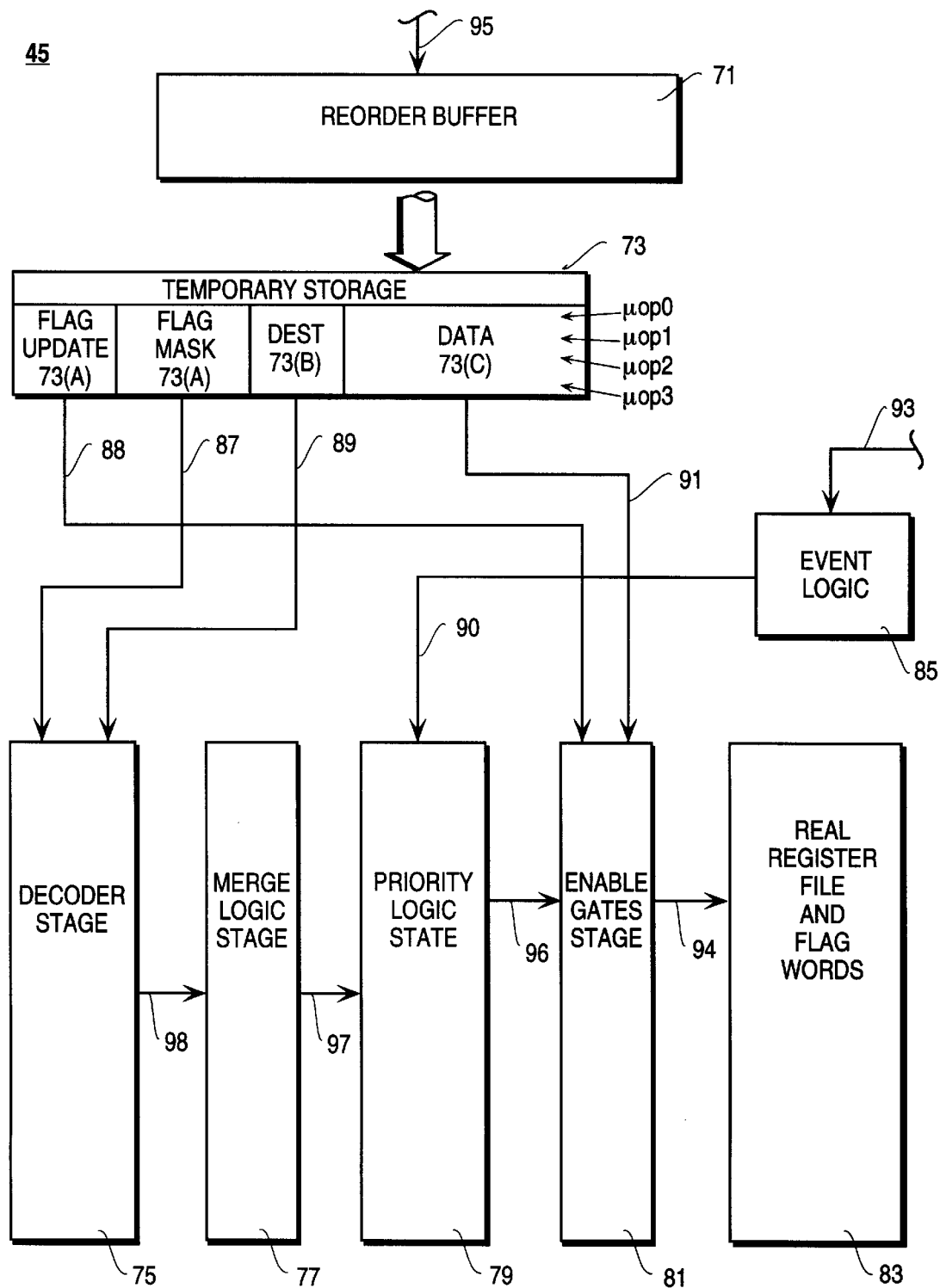
FIG. 3(A) illustrates a block diagram of the overall components and structure of the present invention write override and write merge circuitry for both arithmetic register and flag register write capability.

FIG. 3(A) illustrates an overall block diagram of the preferred embodiment of the present invention write override and write merge logic 45 ("write logic"). The following discussion of FIG. 3(A) is an overview of the high level operations of the present invention logic 45. Specific details of each high level operation and architecture will be further discussed in sections that follow. The logic 45 of the present invention should be viewed as an integral part of a superscalar microprocessor. As shown by FIG. 3(A), a Reorder Buffer 71 receives the results of executed micro-ops over bus 95 and orders the micro-op results according to their original program code order as present within the program code read by the superscalar microprocessor. This ordering process is not pertinent to the present invention and is therefore not described in detail herein. However, it is important to realize that the ROB 71 supplies the present invention, for each clock cycle, with as many as four results (i.e., associated with four separate retiring micro-ops) in program code order. Every clock cycle, the ROB 71 supplies as many as four entries into a temporary storage queue 73 of the present invention logic 45. It is appreciated that less than four entries may be present. It is appreciated that the majority of the discussions to following regarding logic 45 discussion operations of the present invention that occur per clock cycle based on the information supplied by the ROB 71 to the queue 73. For any given clock cycle, if four micro-ops are scheduled for retirement by the ROB 71, then four entries will be passed to the queue 73 for that clock cycle.

As shown by FIG. 3(A) there are four valid entries in the queue 73 called uop0, uop1, uop2, and uop3 for four individual retiring micro-ops. Each entry within the queue 73 contains at least three separate fields. The first field 73(A) contains data and mask information for implicit flag updates. The first part of field 73(A), Flag Update, identifies the data for the flags that changed upon execution of the associated micro-op for implicit updates; this information is sent over line 88. The first part of field 73(A) contains the implicit flag update data associated with the particular micro-op for storage into the register file 83. For instance, if the result of uop2 yielded a zero integer value then the bit of the zero flag would be set corresponding to the EFLAGS word 67 within field 73(A) for uop2. The second part of field 73(A), Flag Mask, contains the implicit flag mask information. For each uop, there is a flag mask that determines which flags will be implicitly updated by that uop. This information is stored in the second part of field 73(A) and transferred over line 87. Therefore, while Flag Update indicates the implicit flag data, Flag Mask indicates which flags are implicitly updated by the uop. See below for explicit flag updates.

The next field 73(B) indicates the destination register for the data of field 73(C). This destination field will indicate which register or register portion of the arithmetic registers must be loaded with the data of the data field 73(C). For instance, the destination field 73(B) for a given micro-op will specify a binary code identifying, AL, AH, EBX, SI, etc. to receive the data. The data length within entry 73(C) will correspond to the size of the register specified in the destination field 72(b). For instance, for a given micro-op if the destination register is EAX then the data within 73(C) will be 32 bits long, or if the destination register is BL then the data within 73(C) will only be eight bits long. It is appreciated that for explicit loads to the flags, the destination field 73(B) for a given micro-op will designate EFLAGS 67 for the FPU 69 status word as the destination; in such case the data 73(C) will correspond to the new flag data to load into the flag register and will be either 32 bits or 16 bits in length depending on the flag register specified by the destination field 73(B). It is appreciated that while implicit flag updates are processed by the present invention from data and mask information of field 73(A), explicit flag updates are processed via fields 73(B) and 73(C).

The destination field 73(B) is input into a decoder stage 75 of FIG. 3(A) which has four separate internal blocks (not shown). The data within the destination field 73(B) for each micro-op entry is fed to a separate internal block of the decoder stage 75 via bus 89 which carries four separate lines, one for each micro-op entry within queue 73. For instance, the destination field 73(B) for uop0 is fed to the first internal block, for uop1 to the second internal block, for uop2 to the third internal block and from uop3 to the last internal decoder block. Bus 89 carries information regarding the destination registers for explicit modifications to the register file 83. Each entry of the queue 73 within the flags mask field 73(A) is also individually coupled to an internal decoder block of the decoder stage 75 via bus 87 which carries four separate lines, one for each micro-op entry within queue 73. For instance, the flag mask field 73(A) for uop0 is fed to the first internal block, for uop1 to the second internal block, for uop2 to the third internal block and from uop3 to the last internal decoder block of the decoder stage 75. The flag mask field indicates which flags in the given uop can update.

Each entry within data field 73(C) for uop0 through uop3 is coupled to the enable gates stage 81 of the present invention logic 45 via bus 91. The enable gates stage 81 will steer the data from each entry of the data field 73(C) to a separate arithmetic or flag register of the real register file ("register file") 83 depending on the write enable outputs supplied by the priority logic stage 79. It is important to realize that when the write enable outputs 94 for the enable gates stage 81 are asserted, the proper data entries of data field 73(C) will be loaded into the proper register of the real register file 83 according to the priority logic of stage 79 and the merge logic of stage 77. It is appreciated that each bit of the registers of the real register file 83 may accept data from any one (but only one) of the entries of queue 73 within the data field 73(C) depending on the state of the enable lines 94. Therefore, each bit of the registers of the real register file 83 also contains four enable lines, one line for each micro-op having an entry within queue 73; and only one enable line can be active for any given bit (i.e., only one entry within the data field 73(C) will routed to any given bit of the real register field 83. As will be discussed further below, a special case exists for bits of the flag registers 67 and 69 in that each bit of these registers actually has two sets of four enable lines. The first set being for explicit updates to these flags (the data coming from the data field 73(C)) and the second set being for implicit updates to these flags (the data in this case coming from the Flag Update flags field 73(A)). Since during implicit flag updates the data arrives from the flags field 73(A), it is coupled via bus 88 to the enable gates stage 81 of the present invention logic 45.

The decoder stage 75 of the present invention logic 45 of FIG. 3(A) will read the entries of the destination field 73(B) for each uop present (i.e., via bus 89) and will set a special bit corresponding to the particular register identified by the destination entry for each uop. For example, with regard to a register having various addressable sizes, if the destination field identifies AL then a one bit field for AL will be set, the same is true for AH. If AX is selected within a register field for a given uop, then an AX bit will be set in the decoder output. Lastly, if EAX is selected according to the destination field 73(B) for a given uop, then a special EAX bit will be set. The same is true for the other 32-bit registers having separately addressable sizes (such as EBX, ECX, and EDX). For all other registers, a special bit will be set within each decoder corresponding to just that register. The above is done for each entry within the destination field 73(B) and therefore four separate decoder blocks are supplied within decoder stage 75 and bus 89 is actually composed of four separate bus supply lines, one for each possible uop present. Since only one destination may be defined for any given micro-op, there will be only one bit set for each decoder output of the decoder stage 75 corresponding to the arithmetic registers. The destination field 73(B) also providing the decoding input for explicit changes of the flag registers 67 and 69.

The decoder stage 75 also receives an input 87 from the Flag Mask flags field 73(A) for each entry of the queue 73 corresponding to a separate uop. Like above, each entry of the flag mask field 73(A) is routed to a separate and corresponding decoder that decodes for implicit changes in the flags status. The decoder blocks of the decoder logic 75 therefore contains a separate bit for each separately addressable bit ("flag") within the floating point unit status word 69 and the EFLAGS status word 67. It is appreciated that since the flag registers are bit addressable (where the arithmetic registers are only byte addressable) the decoder outputs and resulting logic to allow bit addressabilty for the flag registers is quite complex compared to that required for the arithmetic registers. Therefore, according to the above discussions, the decoder logic stage 75 outputs over bus 98 signal lines that correspond to each separately addressable portion of the register file 83 that is desired for update (for each uop of the queue 73) based on the contents of the entries of the destination field 73(B) for explicit updates and of the flags field 73(A) for implicit updates. For instance, if a 32-bit register (EAX) is desired for update, then the separate register portions ("sizes") that comprise that 32-bit register also must be updated. For this reason, a combination of signal lines (e.g., EAX, AX, AH, and AL) are asserted (for each uop) in order to convey that the EAX register is to be updated for a particular uop. The output over bus 98 is in reality four sets of outputs, one set for each micro-op within the queue 73. The output signals 98 also contain information regarding any required implicit and/or explicit updating of the flag bits of each micro-op that can exists within the queue 73.

The signal lines 98 (which will be explained in more detail below) output from the decoder stage are then fed into merge logic stage 77 of the present invention as shown in FIG. 3(A). The merge logic 77 stage of the present invention performs necessary logic to allow merging of data sizes used by the retiring micro-ops within 32-bit arithmetic registers as discussed in the above examples. For instance, if one micro-op writes to AH and another micro-op of the same retiring set writes to AL, assuming no other micro-op of the retiring set writes to any other portion of the EAX register, then both AH and AL will be merged. The data within the data field 73(C) corresponding to the AH micro-op will write to the AH register portion at the same time as the data within the data field 73(C) corresponding to the AL micro-op writes to the AL register portion. In effect, the AL and the AH write operations have been merged together so that they occur simultaneously within a single clock cycle. The output of the merge logic is fed via bus 97 to priority logic 79. Within the merge logic output signals 97 there is a signal for each separately addressable arithmetic register (i.e., AL, AH, and the high word of EAX, it is understood that AX is AH and AL in combination). The signal for that register indicates if that register or register portion is intended to receive data from the queue 73 for any given retiring micro-op. Therefore, the output over bus 97 is in reality four sets of outputs, one set for each micro-up that can be within the queue 73.

The priority logic stage 79 of the present invention logic 45 determines which retiring micro-ops of the queue have priority to write into a given register of the register file 83 assuming they target the same register as discussed in the above examples. The determination of priority is based on the last in time micro-op that was received by the queue 73 and transferred by the ROB 71. Since the ROB 71 delivers micro-ops in their program order, priority is ultimately determined based on the program order of the micro-ops received and placed into the queue 73. By convention only, the queue 73 is filled first from entry 0 and then to entry 3. Therefore the highest priority (i.e., the last in time) is uop3, then next in priority is uop2, then uop1, and lastly the first in time micro-op is uop0 having the lowest priority. For instance, if uop2 and uop1 both needed to write their results into the BX register, the priority logic would ignore the uop1 write (i.e., override it) and only process the uop2 write request, assuming no other micro-op within the queue 73 was to write to the BX register. As discussed above, explicit writes to the arithmetic registers are byte-based and therefore have byte-based enable outputs from stage 79 for each micro-op of the queue 73. The priority logic stage 79 also performs priority determination of explicit and implicit flag updates. As discussed previously, flag updates are bit-based and therefore have bit-based enable outputs per micro-op.

Also input to the priority stage 79 of FIG. 3(A) of the present invention are four guarantee bits over bus 90 that originate from an event logic block 85. There are four possible guarantee bits, one for each of the possible retiring micro-ops of the queue 73. The event logic block 85 receives inputs 93 from the microprocessor and indicate when certain errors or conditions take place that may bar the write update operation (and therefore bar the register file update) of certain of the retiring micro-ops of the queue 73. For instance, if uop2 generated a divide by zero error, then the result of uop3 should not be written to the register file and the guarantee bit for uop3 would not be set. In effect, each guarantee bit for an associated micro-op signifies that the associated uop is "guaranteed" for proper execution and guaranteed for a write operation into the register file 83. If a micro-op is to be denied a write operation because of the event logic 85, it is likely to be a later-in-time micro-op (i.e., a high priority micro-op). The four guarantee bits are fed into the priority logic because if the higher priority micro-ops should not update, then other lower priority micro-ops should be able to update in lieu of the denied micro-op (i.e., take the priority of the denied micro-op). Therefore, if the guarantee bit for a particular micro-op is not set, the present invention write logic 45 will ignore the write operation for that micro-op.

It is appreciated that the special summary bit flag of the floating point status register 69 is also computed within the priority logic stage 79. This will be further covered in discussions to follow.

The resulting outputs of the priority logic stage 79 of the present invention are called write enable signal lines and are carried over bus 96. There are four separate sets of (one for each uop) individual write enable lines and within a given set there is a signal for each separately addressable bit of the arithmetic logic registers of the register file 83. These write enable signals 96 channel data into the register file 83 from the data field 73(C) via the enable stage 81. However, with regard to the arithmetic logic registers, separately addressable portions may share the same enable signal since these registers are only byte addressable. It is appreciated that there are two separate sets of four individual write enable signals lines for each bit of the flag registers. One set of four write enables (one for each uop) is for explicit updates and these enable lines channel data from the data field 73(C) of the queue 73. The other set of four write enables (one for each uop) is for implicit updates of the flag bits and these enable lines channel data from the flag field 73(A) of the queue 73.

Any data channeling from the queue 73 to the register file 83 takes place via the enable gates stage 81 of FIG. 3(A). This stage 81 of the present invention receives bus inputs 91 to receive the data field 73(C) entries of queue 73 and also receives input from bus 88 which carries the flag update (data) entries from field 73(A). Write enable signals 96 inform the enable gates stage 81 of which data received over bus 88 and 91 will be sent to which register of the register file 83 or to which bits of the flag registers 67 and 69 of the register file 83. Once the enable gates are open according to the write enable signals, a data path is formed between the data of the queue and the destination registers and/or bits of the register file 83 so that the entire write operation into the real register file 83 from the queue takes place within one operation is done within a half clock cycle. Data is channeled to the real register file 83 via bus 94 as shown. Bus 94 carries a separate line to each and every bit of the registers of the register file 83, including the flag registers. It is appreciated that for each bit of the register file 83 only one write enable signal will be active at any given time of the four possible write enable signals that control the data path for that bit. Each of the four write enable signals are associated with a separate micro-op entry of the queue 73.

Figure 3B:
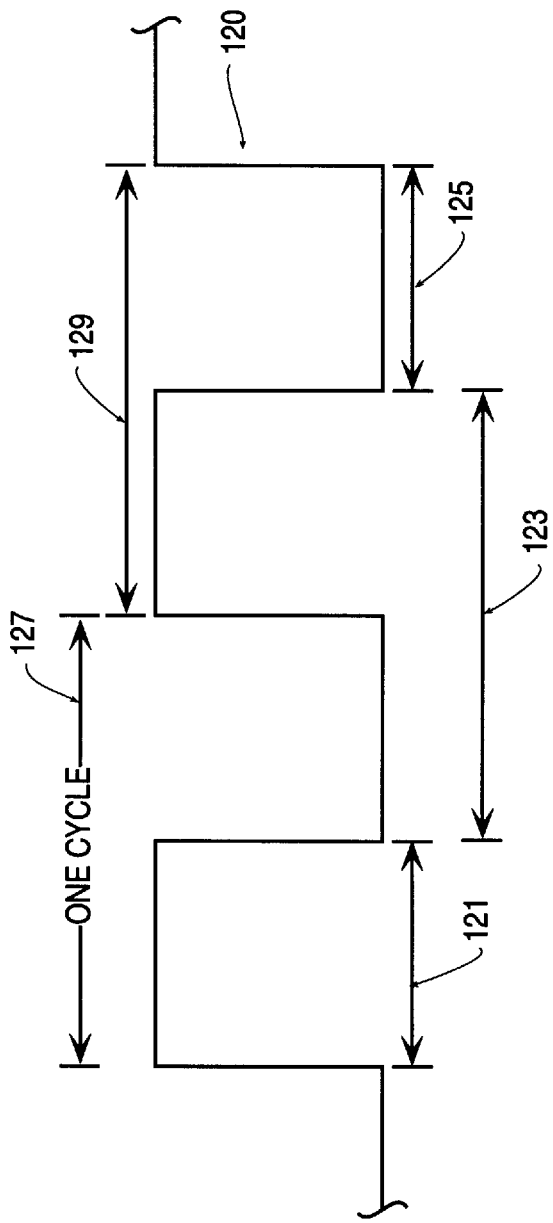
FIG. 3(B) is an illustration of the timing of the operation of the present invention for a single instruction moving through an execution pipeline of a superscalar microprocessor.

FIG. 3(B) illustrates a timing diagram of the pipeline stages of the present invention in relation to a system clock signal 120. One cycle of the clock is shown as 127 and is approximately 6.6 nanoseconds in duration. During the first ½ cycle period 121 the data is read by the present invention write logic 45 from the ROB 71 and the data for the set of retiring micro-ops is placed into the queue memory 73; this occurs in 3.3 nanoseconds. During the second ½ clock cycle and the next first ½ cycle (i.e., period 123) the guarantee bits are determined according to the event logic block 85; this occurs in 6.6 nanoseconds. The actual operations of the event logic blocks 85 are not pertinent to aspects of the present invention and therefore and not described in detail herein. It is sufficient that the guarantee bits from block 85 will indicate if the data for any given retiring micro-op is to be written into the real register file 83 or should be ignored. During the last ½ clock cycle period 125, the present invention write logic 45 performs the decoding of stage 75, the merge determinations of stage 77, the priority determinations of stage 79 and enables the data path via enable stage 81 and writes the register and flag data from the queue 73 into the real register file 83. The above occurs within the last 3.3 nanoseconds. While the guarantee bit computation requires one clock cycle, aside from the guarantee bit computation period, it should be understood that the functions of the present invention write logic 45 operate to read the ROB and store the results of a given set of retiring uops into the register file 83 within a single clock cycle. This is true for uops within a given retiring set that target the same register.

It is understood that the process of the present invention write logic 45 is pipelined. Therefore, at the start of cycle 127, data for a first set of retiring micro-ops are read by the write logic 45 of the present invention. At the second half of cycle 127 the guarantee logic is determining the state of the signals 90. At the start of cycle 129 while the guarantee logic 85 is still determining the state of the signals 90 for the first set of retiring micro-ops, the present invention write logic 45 will read a second subsequent set of retiring micro-ops into a different portion of the queue memory 73. At the last cycle 125, the present invention write logic 45 will (1) perform the decode, merge, prioritize, enable and write functions to the real register file for the first set of retiring micro-ops while (2) performing the first half of the guarantee bit computation on the second set of retiring micro-ops. At the next full clock cycle the results of the second set of micro-ops will be written into the register file 83 and a third set of retiring micro-ops will be read from the ROB 71, and so on. As such, the queue 73 acts as a double buffer in that it may hold two sets of retiring micro-ops that are in different stages of the pipeline process. Such double buffering techniques are well known in the art and any such well known double buffer method of the queue 73 may be implemented within the constraints of the present invention write logic 45.

Figure 4A:
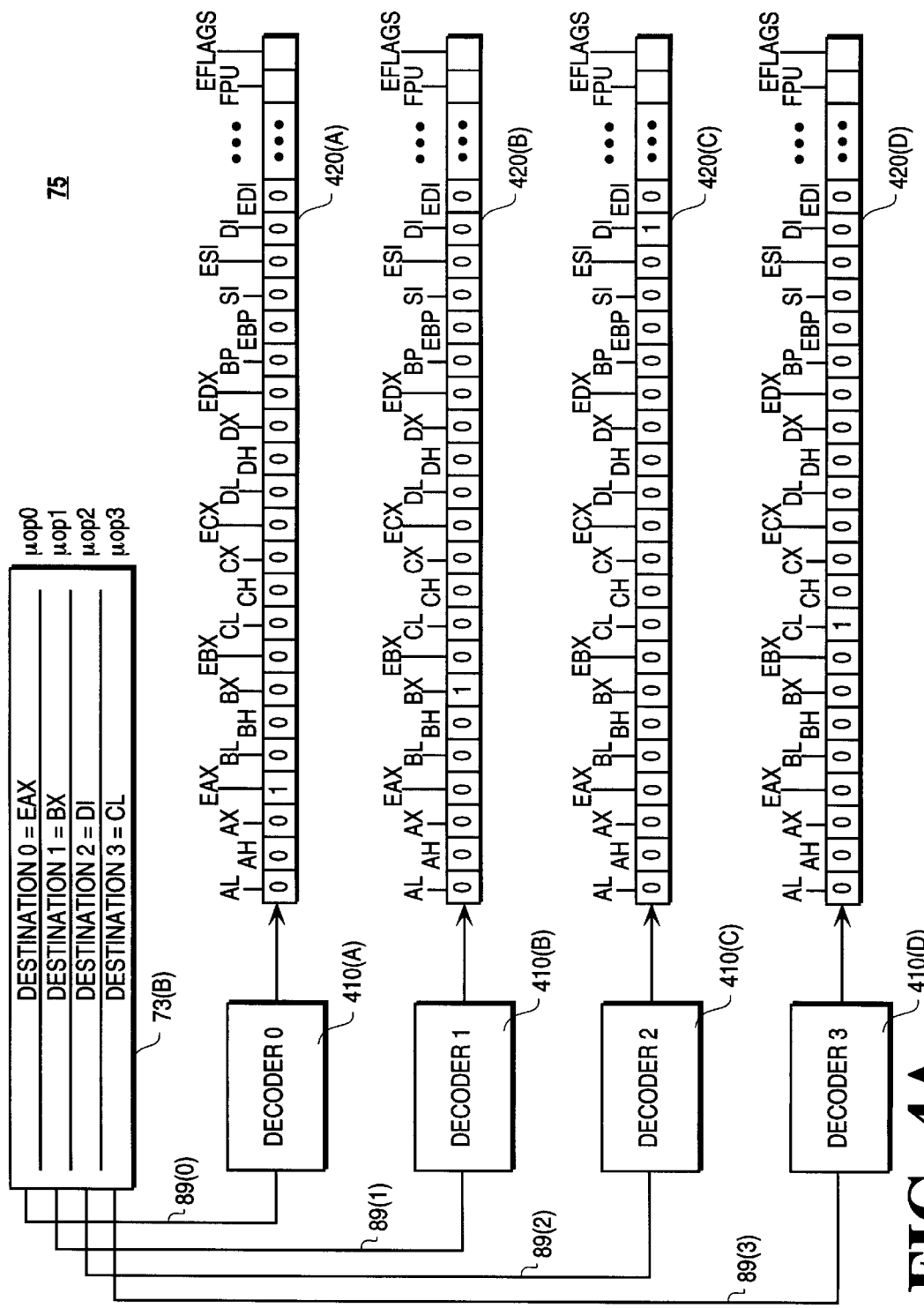
FIG. 4(A) illustrates the individual decoder stages and outputs of the present invention write logic for explicit writes to arithmetic registers and flag registers of the real register file.

FIG. 4(A) illustrates the portion of the decoder stage 75 of the present invention that decodes explicit write operations of the retiring uops for both the arithmetic registers and the flag registers 67 and 69. There are four separate explicit decoder units 410(A), 410(B), 410(C) and 410(D) for the four possible retiring micro-ops that can be present, uop0, uop1, uop2, and uop3, respectively. Each of the inputs of the four explicit decoder units is separately coupled to an entry of the entries of destination field 73(B) of the data queue 73. The decoder units are individually coupled to the destination field 73(B) via four separate lines 89(0)–89(3) as shown. These lines exist within the bus 89 (of FIG. 3(A)). Decoder 410(A) is coupled to the entry for uop0, decoder 410(B) is coupled to the entry for uop1, decoder 410(C) is coupled to the entry for uop2, and decoder 410(D) is coupled to the entry for uop3. Each explicit decoder unit is of the same design, and will input the special binary code representing the particular destination register (i.e., AX, BX, EBX, AL, DI, etc.) of the register file 83 over the input lines and will set a bit within the explicit decoder's output that corresponds uniquely to that particular destination register. Each decoder unit has a separate output and a sample of the outputs for each are shown in FIG. 4(A). Since each retiring uop can at most have one destination, it is appreciated that at most only one bit may ever be set in any given explicit decoder output. The outputs of the explicit decoders are 420(A), 420(B), 420(C) and 420(D) as shown and these outputs correspond to the decoder units 410(A), 410(B), 410(C) and 410(D), respectively. It is appreciated that if a flag register is targeted explicitly, each flag bit within the flag register will be targeted for update for any given uop.

It is appreciated that the actual size of the decoder outputs are quite large since they must individually account for each register that may be explicitly targeted (i.e., written to) by a given uop. In an effort to provide a clear understanding of the present invention, only a representative sample of these possible registers are shown in FIG. 4(A). However, present invention write logic 45 includes similar logic for each register of the real register file 83 that can be targeted by the retiring micro-ops. The individual decoder outputs shown illustrate the general purpose arithmetic registers as discussed above as well as BP, EBP, SI, ESI, DI, EDI, and the two flag registers, FPU status word 69 and EFLAGS 67. The flag registers are present because they may be explicitly targeted by a uop with flag mask data. The technique of recognizing a unique input code (i.e., a binary code designating a particular register) and then setting a unique bit in an output register corresponding to that code is a well known decoder function. For this reason the specific details of the explicit decoder blocks are not presented in detail herein. Further, any of the well known decoder techniques satisfying constraints of the present invention may be utilized within the explicit decoder units 410(A)–410(D).

Some illustrative examples of the destination field input and resultant explicit decoder output are shown in FIG. 4(A) and discussed herein. The destination field for uop0 indicates that EAX will be the target for the data of this uop0. The binary code for EAX is fed to decoder 410(A) over line 89(0) and the output 420(A) illustrates that a single bit has been set corresponding to the EAX location which represents all 32 bits of the EAX register; the other bits of output 420(A) are zero. The destination field for retiring uop1 indicates that BX will be the target for the data of this uop1. The binary code for BX is fed to decoder 410(B) over line 89(1) and the output 420(B) illustrates that a single bit has been set corresponding to the BX location which represents the lower 16 bits of the 32-bit EBX register; the other bits of output 420(B) are zero. Retiring uop2 targets the DI register so decoder 410(C) generates output 420(C) with the unique bit for DI set to "1" with the remaining bits zero. Lastly, output 420(D) generated from explicit decoder 410(D) has a bit set corresponding to the CL register because retiring uop3 targets the CL register which is the lowest 8 bits of the 32-bit ECX register position. It is appreciated that the entries for the destination field 73(B) of the retiring uops are read by the four decoders 410(A)–410(D) simultaneously and the four outputs 420(A)–420(D) are generated simultaneously thereafter by the decoders. For any given decoder output 420(A)–420(D) only one bit will be set at any time. A bit set in these outputs indicates that an explicit write operation (of byte boundary or larger) is desired into the indicated register by one of the retiring uops.

Figure 4B:
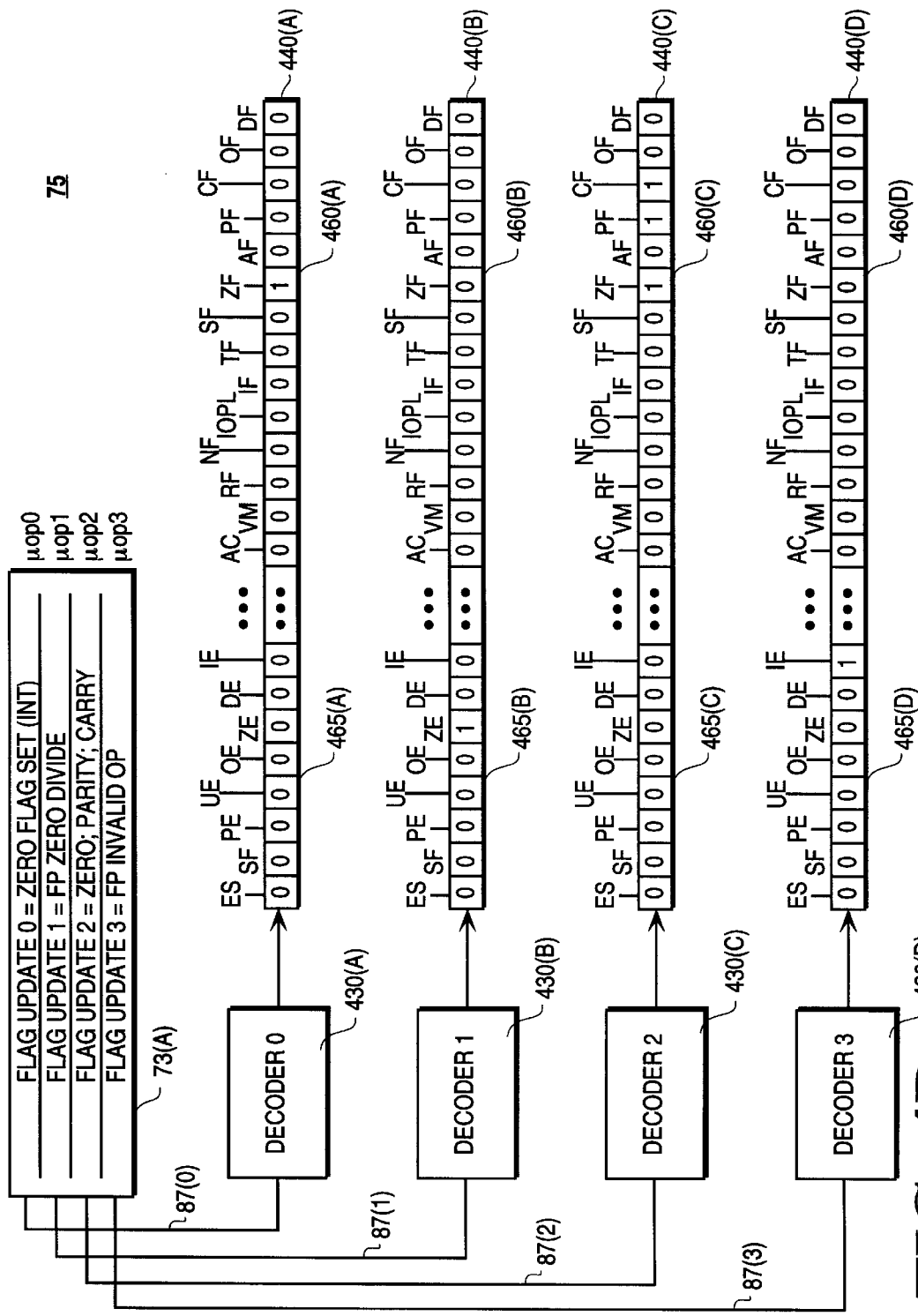
FIG. 4(B) illustrates the individual decoder stages and outputs of the present invention write logic for implicit writes to the bits of the flag registers of the real register file.

FIG. 4(B) illustrates the portion of the decoder stage 75 of the present invention that decodes implicit flag write operations of the four possible retiring uops to individual bits of the flag registers 67 and 69. There are four separate implicit decoder units 430(A), 430(B), 430(C) and 430(D) for the four possible retiring micro-ops that can be present, uop0, uop1, uop2, and uop3, respectively. Each of the four implicit decoder units is separately coupled to an entry of the entries of the Flag Mask portion of flag field 73(A) of the data queue 73. The decoder units are individually coupled to the Flag Mask portion of flag field 73(C) of the queue via four separate lines 87(0)–87(3) as shown. These lines exist within the bus 87 (of FIG. 3(A)). Decoder 430(A) is coupled to the entry for uop0, decoder 430(B) is coupled to the entry for uop1, decoder 430(C) is coupled to the entry for uop2, and decoder 430(D) is coupled to the entry for uop3. Each implicit decoder unit is of the same design, and will input the special binary code representing the particular single flag bit or bits (i.e., ZE, ZF, AF, PF, CF, OF, etc.) of the flag registers of the register file 83 and will set a bit within the decoder's output that corresponds uniquely to that particular destination flag bit or bits (more than one bit may be updated per uop). Each implicit decoder unit has a separate output and a sample of the outputs for each are shown in FIG. 4(B). It is understood that each retiring uop can implicitly update more than one flag at a time. Therefore it is appreciated that more than one flag bit may be set in any given decoder output. The outputs of the implicit decoders are 440(A), 440(B), 440(C)

and 440(D) and these outputs correspond to the decoder units 430(A), 430(B), 430(C) and 430(D), respectively.

The entries of the flags field 73(A) of the Flag Mask portion indicates only which flag bits require updating and does not indicate the state to which these flags bits should be updated. The update state is given via the Flag Update portion of field 73(A). Therefore, the flag field 73(A), Flag Mask, imparts destination information while the source data information is given by the Flag Update section. For this reason the Flag Mask portion of flag field 73(A) is directly coupled to the enable stage 81. The destination information of the flag field will be used by the implicit decoders to set the proper bits to be updated and the Flag Update of field 73(A) will be used to load the bits of the real register file 83 with the proper implicit flag data.

It is appreciated that the actual size of the implicit decoder outputs are quite large since they must individually account for each flag bit that may be implicitly updated by the retiring uops. In an effort to provide a clear understanding of the present invention, only a representative sample of the flag bits are shown in FIG. 4(B). However, present invention includes similar logic for each flag bit of the real register file 83 that can be targeted by the retiring micro-ops. The individual flag bits illustrated correspond the flag bits of the EFLAGS register 67 and the floating point unit status register 69. Within the FPU status register, ES is the error summary, SF is the stack fault, PE is the precision exception, UE is the underflow exception, OE is the overflow exception, ZE is the divide by zero exception, DE is the denormalized operand exception, and IE is the invalid operation exception flag (all of the Intel architecture instruction set). Within the EFLAGS register, AC is alignment check, VM is virtual 8086 mode, RF is the resume flag, NF is the nested flag, IOPL is the I/O privilege level, IF is the interrupt flag, TF is the trap flag, SF is the sign flag, ZF is the zero flag, AF is the auxiliary carry flag, PF is the parity flag, CF is the carry flag, OF is the overflow flag, and DF is the direction flag (all of the Intel architecture instruction set). The technique of recognizing a unique input code (i.e., a binary code designating a particular flag bit) and then setting a unique bit in an output register corresponding to that code is a well known decoder function. For this reason the specific details of the implicit decoder blocks are not presented in detail herein. Any of the well known decoder techniques satisfying constraints of the present invention may be utilized within the implicit decoder units 430(A) –430(D).

Some illustrative examples of the flag field input and resultant implicit decoder output are shown in FIG. 4(B) and discussed herein. The uop0 via input line 87(0) sets the zero flag of EFLAGS so that bit 460(A) is set within decoder output 440(A). The uop1 sets the floating point zero divide flag, so decoder 430(B) sets the appropriate bit ZE of output 440(B). The error summary bit (ES) will be set later by the present invention. The uop2 changes three flags, it sets the zero flag, resets the parity flag and sets the carry flag. Decoder 430(C) outputs three bits, one for ZF, one for PF and one for CF within the output 440(C). Lastly, uop3 sets the floating point invalid operation flag so decoder 430(D) sets the IE flag of decoder output 440(D). It is appreciated that the entries for the flag field 73(A) of the retiring uops are read by the four implicit decoders 430(A)–430(D) simultaneously and the four outputs 440(A)–440(D) are generated simultaneously thereafter by the implicit decoders. For any given implicit decoder output 440(A)–440(D) more than one bit may be set at a given time. The bits set in these outputs indicate that an implicit write operation is desired into the indicated flag bits by one of the retiring uops.

Figure 5:
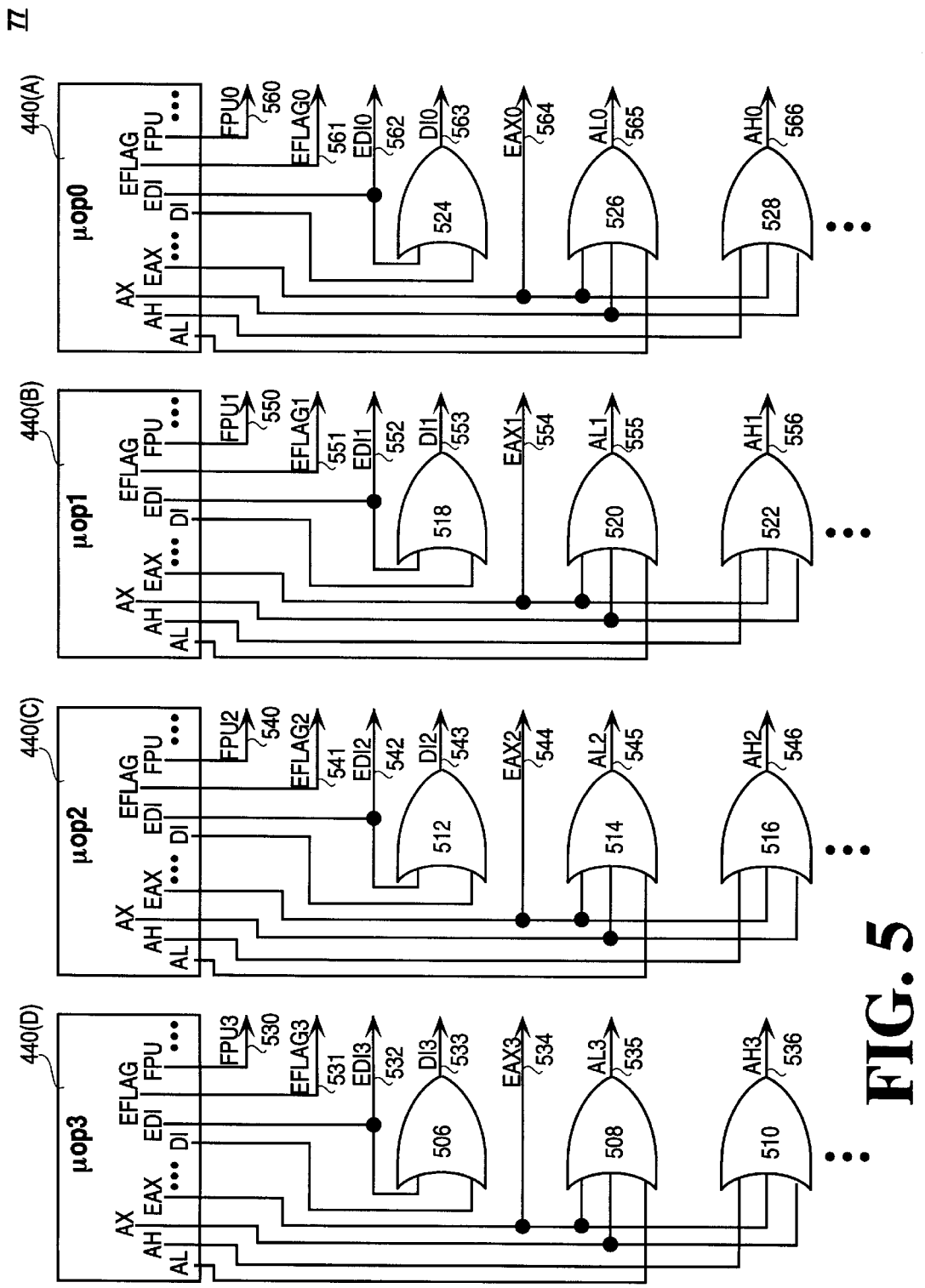
FIG. 5 illustrates merge logic of the data merge stage of the present invention required for generation of enable signals for the 32 bits of the EAX register, including AL, AH and the high word of the EAX register.

FIG. 5 illustrates the merge logic stage 77 of the present invention write logic 45 embodiment for a selected number of target registers. It is appreciated that in an effort to clarify operations of the present invention, the logic for a selected number registers is shown in FIG. 5. It is further appreciated that the logic shown is replicated within the present invention to account for each register signal of the decoder outputs 440(A)–440(D). Signals of similar kind utilize similar logic as shown in FIG. 5. The contents of the explicit write decoder outputs 440(A) through 440(D) are transferred to the merge logic stage via bus 98 (of FIG. 3(A)). The merge logic 77 of the present invention deals with the cases wherein data of differing sizes is written into various portions of a 32-bit register. For example, if data is written to EAX then by default the AL register and AH register must necessarily update. Similarly, if the AX register is written to, the AL and AH registers must update. In order to perform accurate priority determinations, the present invention first determines the merging possibilities.

With reference to FIG. 5, the signals corresponding to uop3 will first be discussed with reference to output 440(D). The AH bit, the AX bit and the EAX bit for uop3 are fed to OR gate 510 to generate the AH3 enable signal. The AH3 signal 536 will be enabled ("asserted") if any of the registers of AH, AX or EAX are targeted by uop3. Similarly, the AL bit, the AX bit and the EAX bit for uop3 are fed to OR gate 508 to generate the AL3 enable signal. The AL3 signal 535 will be enabled if any of the registers of AL, AX or EAX are targeted by uop3. It is noted that there is no AX3 enable signal because if the AX register is targeted by uop3 then the logic of OR gates 508 and 510 will signal both the AL3 and the AH3 signals to enable. It is further noted that the EAX3 enable signal 534 is taken directly from the output 440(D) because no other register destination targets the EAX register. It should be noted that the EAX3 enable signal 534 only corresponds to the high word of the EAX 32-bit register. That is, if EAX is the target, then all signals AH3, AL3 and EAX3 will be enabled at the same time.

If uop3 targets one of the flags, then either the FPU3 signal 530 will enable or the EFLAG3 signal 531 will enable. If EDI is the target, then OR gate 506 will enable signal 533 (the DI3 signal) and the output 440(D) will enable the EDI3 signal 532. Of course, there are many more registers that may be enabled by uop3 (i.e., at least those previously shown with respect to output 440(D)). For each of these registers, the present invention provides a replication of the circuitry described above so that each destination register has an independent enable signal or signals as the case may be. Registers and portions of EBX, ECX, EDX are realized similarly to EAX as shown in FIG. 5. Registers not having separately addressable portions do not require any OR gates as data merging is not possible.

FIG. 5 also illustrates logic required to provide the merging capability for the remainder three uops. As shown this logic is similar to that described with reference to uop3 except a different decoder output is utilized. For instance, the logic required to generate the enable signals for uop2 receives inputs from 440(C) and generates sample outputs 540 to 546. The logic to generate the enable signals for uop1 receives inputs from 440(B) and generates sample outputs 550 to 556, and lastly the logic for uop0 receives its inputs from 440(A) and generates sample outputs 560 to 566. It is appreciated that any circuit replication as discussed above to deal with all the possible destination registers of uop3 is similarly provided within the present invention for each of the retiring uops of uop2, uop1, and uop0. For clarity, this replicated logic is not shown in detail herein. The output signals of the data merge stage 77 of the present invention indicate, for a particular uop, that the uop will write to a desired location within the register file 83. Table 1 below indicates that register location with reference to the examples of FIG. 5. Note AX is a redundant enable signal and therefore is not present within Table 1.

TABLE 1

| Signal | Uop# | Bits Updated |
| --- | --- | --- |
| EAX3 | uop3 | High word of EAX (16 bits) |
| AH3 | uop3 | High byte of low word of EAX (8 bits) |
| AL3 | uop3 | Low byte of low word of EAX (8 bits) |
| EDI3 | uop3 | High word of EDI (16 bits) |
| DI3 | uop3 | Low word of EDI (16 bits) |
| FPU3 | uop3 | Entire FPU register (16 bits) |
| EFLAG3 | uop3 | Entire EFLAG register (32 bits) |

It is appreciated that the enable outputs generated by the data merge stage 77 of the present invention are fed to the priority stage 79 via bus 97. Therefore signals 530–536, 540–546, 550–556, and 560–566 are output over bus 97. Signal terminology of the present invention defines "AL1" (signal 555) to mean the enable signal for register AL for the uop1. Other signals of bus 97 adopt similar definition.

Figure 6A:
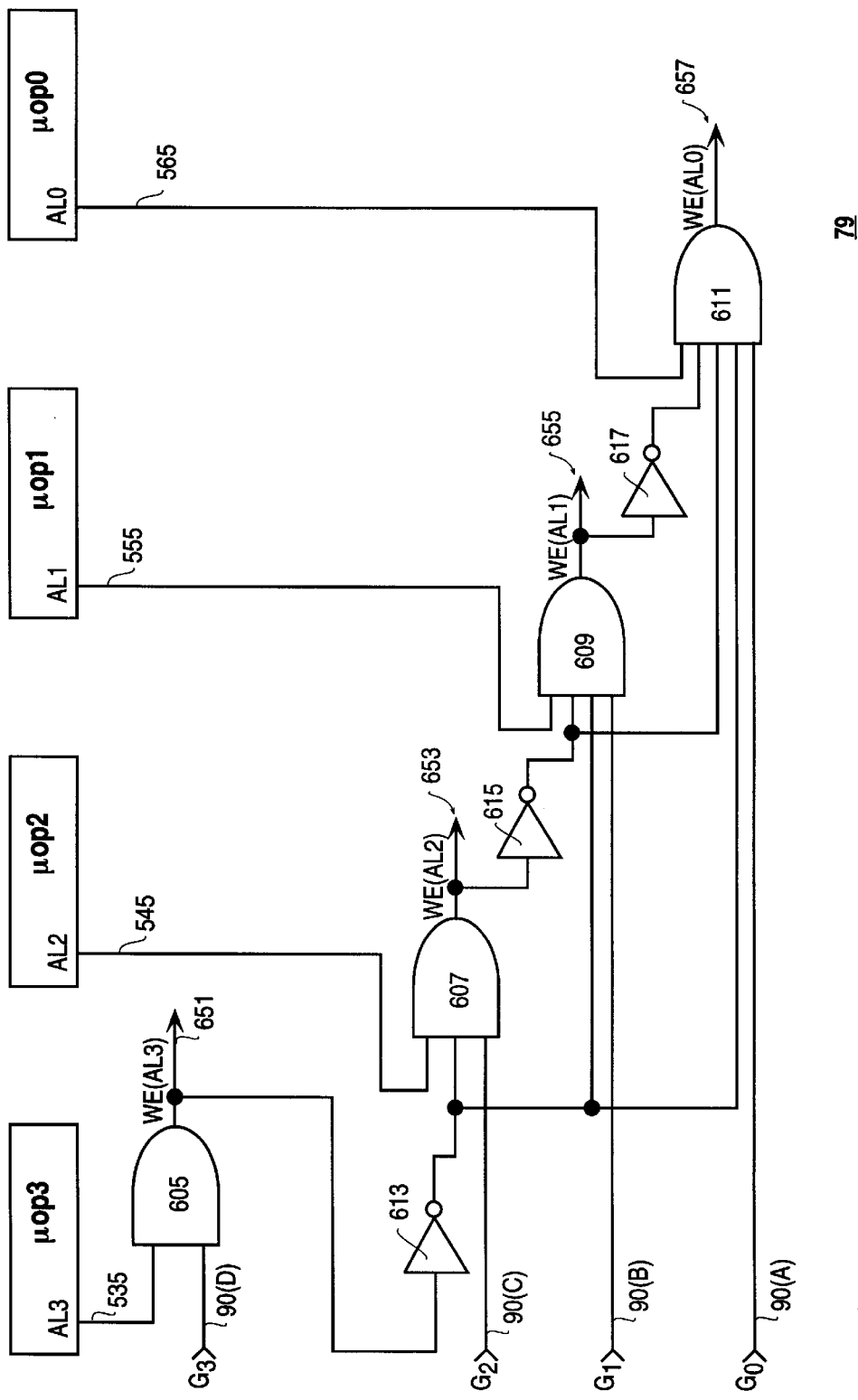
FIG. 6(A) is an illustration of the priority logic of the priority stage of the present invention required to generate the write enables for the 8 bits of the AL register of the register file.
Figure 6B:
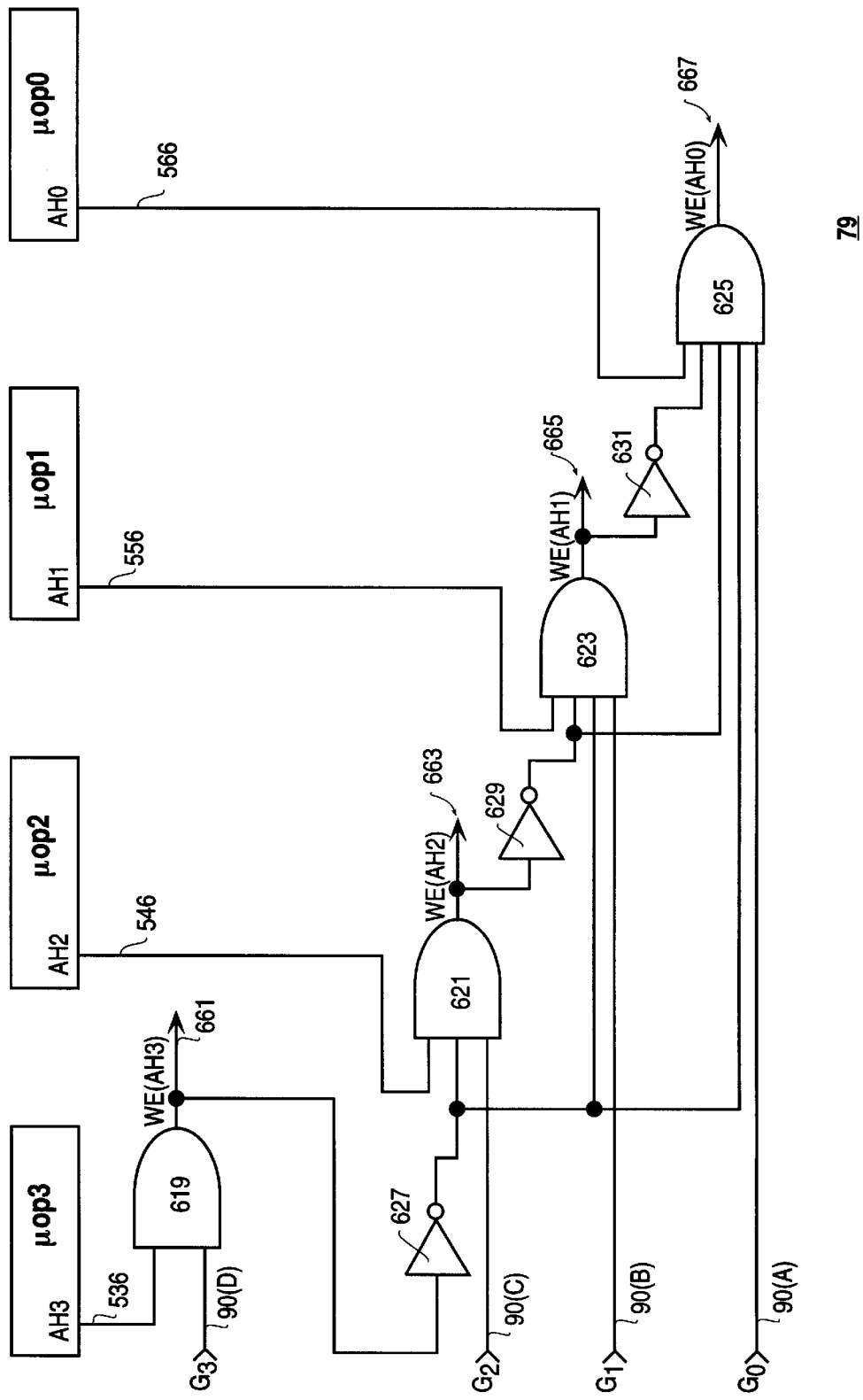
FIG. 6(B) is an illustration of the priority logic of the priority stage of the present invention required to generate the write enables for the 8 bits of the AH register of the register file.
Figure 6C:
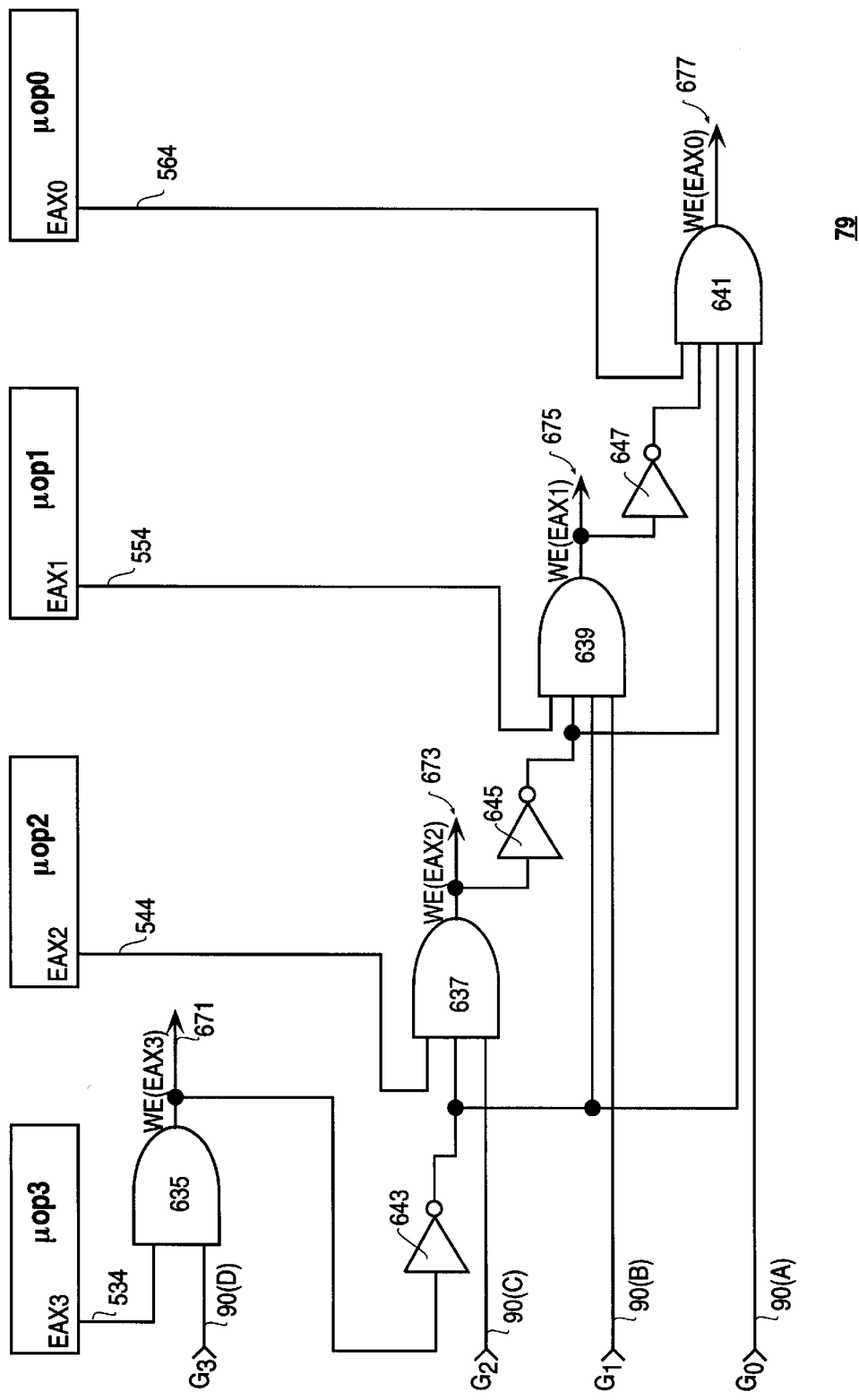
FIG. 6(C) is an illustration of the priority logic of the priority stage of the present invention required to generate the write enables for the 16 bits of the high word of the EAX register.

The following FIG. 6(A), FIG. 6(B), and FIG. 6(C) illustrate sample logic of the priority stage 79 of the present invention for explicit write operations into the register file 83 for uops targeting the arithmetic registers. The logic of FIG. 6(A), FIG. 6(B), and FIG. 6(C) does not include explicit write operations for the flag registers 67 and 69.

FIG. 6(A) illustrates the portion of the priority logic of the priority stage 79 of the present invention that determines the write enable signals for the AL register. The enable signals from the data merge stage 77 are input to the priority stage 79 via bus 97. Since uop3 is the last received uop of the retiring set according to the program code order, uop3 will always have the highest priority when present. The uop2 will have next priority, then uop1 and the lowest priority uop is uop0 which is the first in time uop received of the retiring set. Guarantee bits are also fed to the priority stage 79. As introduced above, four guarantee bits G0 to G3 are generated by the event logic circuit 85 which correspond to each retiring uop. These bits are supplied to the priority logic stage 79 via bus 90 and arrive as signals 90(A), 90(B), 90(C) and 90(D) for uop0, uop1, uop2, and uop3, respectively. It is appreciated that the write enable signals generated as output by the priority stage 79 of the present invention are those signals that are actually fed to the enable gates of stage 81 to create the data path for steering data from the entries of the data field 73(C) of the queue 73 to the real register file 83.

According to the logic of FIG. 6(A), the write enable for the AL register for uop3 (WEAL3 signal 651) is active if the high priority AL3 enable line 535 is active and the guarantee bit for uop3 90(D) is enabled. In other words, if high priority uop3 targets the bits of the AL register, and uop3 is guaranteed to write its results, then it may have a write enable for the AL register. It is appreciated that when signal line 651 goes high, each bit of the AL register will accept data from the entry of the data field 73(C) corresponding to uop3. Next, the enable signal 545 for AL2 is fed to AND gate 607 and also the inverted signal of 651 from inverter 613 is fed to gate 607. The guarantee bit 90(C) for uop2 is also fed to gate 607. Therefore, the write enable for AL for uop2 (WEAL2 signal 653) is active only if the write enable for higher priority uop3 is not active, AL2 is enabled and the guarantee bit for uop2 is enabled. Like signal 651, signal 653 enables all bits of the AL register, but here they accept data from the entry of the data field 73(C) corresponding to uop2.

Next, the enable signal 555 for AL1 is fed to AND gate 609 and also the inverted signal of 653 from inverter 615 is fed to gate 609. Also fed to AND gate 609 is the inverted signal of 651 from inverter 613. The guarantee bit 90(B) for uop1 is also fed to AND gate 609. Therefore, the write enable for the AL register for uop1 (WEAL1 signal 655) is active only if the write enables for the higher priority uop3 and uop2 are not active, AL1 is enabled, and the guarantee bit for uop1 is enabled. Like signal 651, signal 655 enables all bits of the AL register, but here they accept data from the entry of the data field 73(C) corresponding to uop1. Last, AND gate 611 accepts input from the AL0 enable 565, the inverted signal of 655, the inverted signal of 653 and the inverted signal of 651. The guarantee bit 90(A) for uop0 is also fed to AND gate 611. The write enable for the AL register for uop0 (WEAL0 signal 657) is only asserted if none of the higher priority uops are enabled and uop0 is enabled and guaranteed. Signal 657 enables register AL to accept data from field 73(C) for uop0. It is appreciated that only one signal of 651, 653, 655, and 657 can be active (if any) for a given set of retiring uops. The signals 651, 653, 655, and 657 are then output over bus 96 to the enable gates stage 81 of the present invention.

FIG. 6(B) illustrates the portion of the priority logic of the priority stage 79 of the present invention that determines the write enable signals for the AH register. The basic logic technique is analogous to the logic of FIG. 6(A). The four guarantee bits are equivalent to those shown in FIG. 6(A). The inputs to the circuitry are the enable lines for the AH register for the four uops (i.e., 536, 546, 556, and 566 for uop3 to uop0 respectively). The write enable outputs 661, 663, 665, and 667 enable register AH of the register file to accept data from the entries of data field 73(C) corresponding to uop3, uop2, uop1, and uop0, respectively. It is appreciated that only one signal of 661, 663, 665, and 667 can be active (if any) for a given set of retiring uops. The signals 661, 663, 665, and 667 are then output over bus 96 to the enable gates stage 81 of the present invention.

FIG. 6(C) illustrates the portion of the priority logic of the priority stage 79 of the present invention that determines the write enable signals for the high word of the EAX register. The basic logic technique is analogous to the logic of FIG. 6(A) or FIG. 6(B). The four guarantee bits are equivalent to those shown in FIG. 6(A) or FIG. 6(B). The inputs to the circuitry are the enable lines for the EAX register for the four uops (i.e., 534, 544, 554, and 564 for uop3 to uop0 respectively). The write enable outputs 671, 673, 675, and 677 enable the high word of register EAX of the register file 83 to accept data from the entries of data field 73(C) corresponding to uop3, uop2, uop1, and uop0, respectively. It is appreciated that only one signal of 671, 673, 675, and 677 can be active (if any) for a given set of retiring uops. The signals 671, 673, 675, and 677 are then output over bus 96 to the enable gates stage 81 of the present invention.

It is appreciated that while the priority logic of the AL, the AH, and the high word of the EAX register are illustrated, the present invention provides a replication of such logic for each arithmetic register of the register file that can be explicitly updated. For clarity, all of such logic is not covered in detailed herein. It is understood, however, that for each register of the register file that can be targeted as a destination register according to the uops within the queue 73, a separate set of four write enable signals will be generated. Within each set of four signals, there is a separate signal for each possible retiring uop. Also, for each set of four explicit write enable signals, only one may be active at any given time. When active, the write enable signal will channel data from a particular entry of the data field 73(C) (i.e., that entry corresponding to the write enable signal's associated uop) into the designated destination register of the register file 83. Therefore, with reference explicit write operations, a particular write enable signal may enable all the bits of a byte or a word register. As will be shown below, the priority logic for flags is performed on a bit by bit basis because each flag bit may be separately addressable implicitly.

Figure 7A:
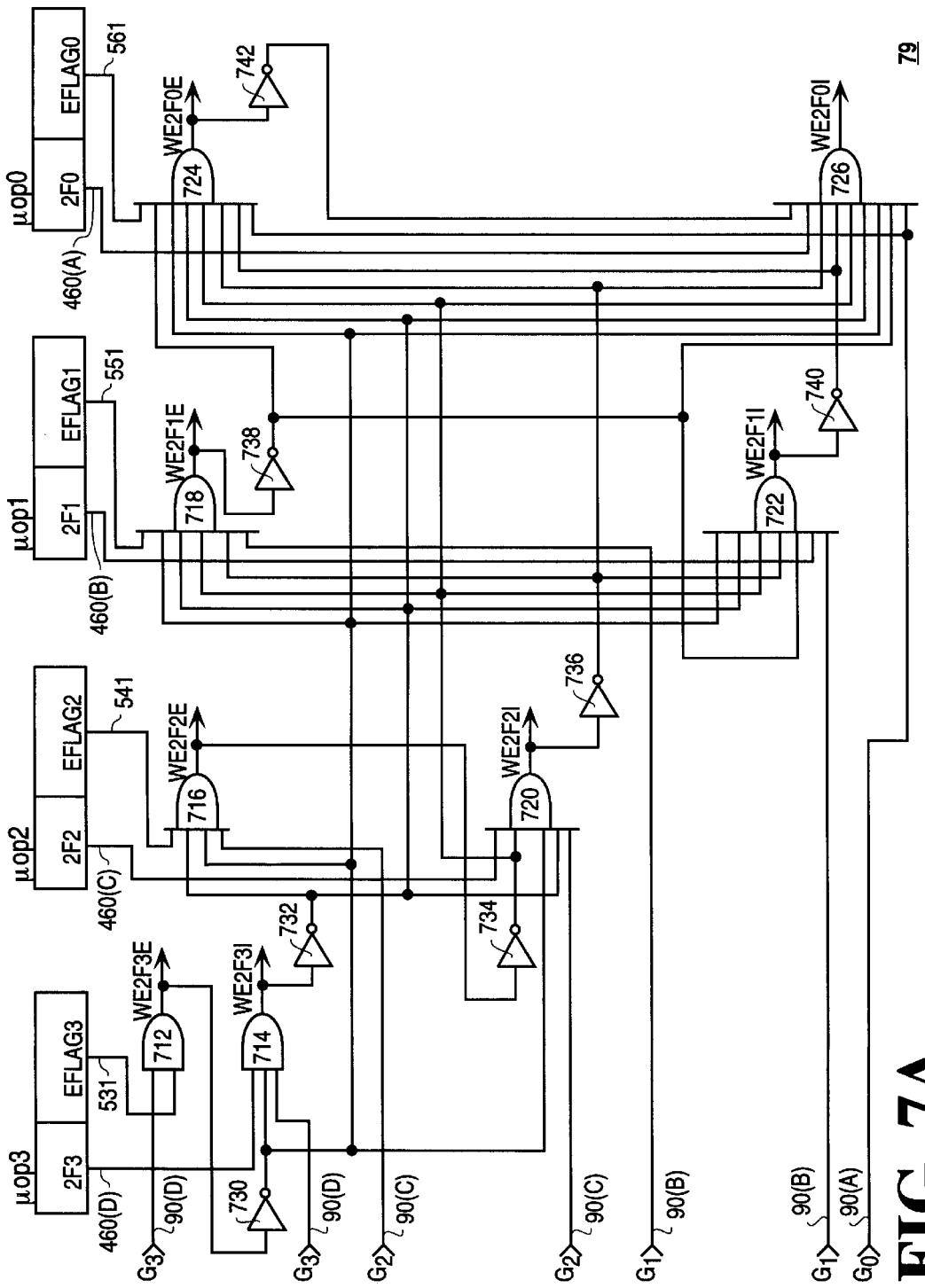
FIG. 7(A) illustrates the priority logic of the priority stage of the present invention required to generate the write enables for the zero flag of the EFLAGS register, including explicit and implicit write conditions.

FIG. 7(A) illustrates the portion of the priority logic of the priority stage 79 of the present invention that determines the implicit and explicit write enable signals for the zero flag of the EFLAGs register 67. The logic of FIG. 7(A) may also be used in similar fashion to realize the explicit and implicit write enables for other flag bits of the EFLAGS register. Since each flag bit of the flag registers may be either implicitly or explicitly updated, each flag bit must have two separate sets of four write enables. One set of four are the explicit write enables corresponding to each possible retiring uop and the other set of four are the implicit write enables corresponding to each possible retiring uop. Priority logic of the priority stage 79 for flag bits must maintain priority across both implicit and explicit write operations and also must maintain priority across the various uops. FIG. 7(A) illustrates the circuitry of the present invention write logic 45 that accomplishes the above priority for the zero flag bit of the EFLAGs register 67. The four guarantee bits 90(A) to 90(D) are input for uop0 to uop3. Explicit write requests for each of the retiring uops are input via lines 531, 541, 551, and 561 and are supplied from the merge stage 77. Implicit write requests from each of the retiring uops are input for each bit via the implicit decoder outputs 440(A)–440(D). A particular bit for each uop of the decoder outputs is shown as 460(A)–460(D).

Refer still to FIG. 7(A). The write enable signal WEZF3E is the write enable for the explicit write to all bits of the EFLAGs register 67 which contains the zero flag bit (ZF).

It will be active ich contains the zero flag bit (ZF). It will be active (i.e., AND gate 712 will assert a signal) if the EFLAG3 signal 531 is asserted and if high priority uop3 is guaranteed. The EFLAG3 signal 531 is input from the bus 97 and is a product of the merge logic. The signal for EFLAG3 is the same as supplied from decoder output 440(D). It is appreciated that the signals 531, 541, 551, and 561 may be used for the priority logic of all bits of the EFLAGs register 67. This is case because these above four signals are explicit write enables which target all bits of an entire register. The write enable signal for the implicit write operation to the ZF flag for uop3 is WEZF3I and is output from AND gate 714 which includes the zero flag mask bit. This signal can only be asserted if an implicit update for the ZF is required (as specified by the flag mask) by high priority uop3 and an explicit write the EFLAGS is not also requested by uop3 and uop3 is guaranteed. Explicit write operations take priority over implicit write operations to a given flag bit for a given retiring uop. The ZF3 signal over line 460(D) originates from the implicit decoder output 440(D).

The write enable for the explicit write operation to ZF of uop2 (WEZF2E) is asserted by AND gate 716 only if uop2 requests an explicit write to EFLAG (i.e., line 541 is asserted), high priority uop3 is not explicitly writing to ZF, high priority uop3 is not implicitly writing to ZF, and uop2 is guaranteed. Likewise, the write enable for the implicit write operation to ZF of uop2 (WEZF2I) is asserted by AND gate 720 if uop2 requests an implicit write to ZF as specified by the bits of the flag mask (i.e., line 460(C) is asserted), uop2 is not requesting an explicit write to EFLAG, uop3 is not explicitly writing to ZF, uop3 is not implicitly writing to ZF, and uop2 is guaranteed. Under the same rationale, the write enable signal for the explicit write operation to ZF of uop1 (WEZF1E) is asserted by AND gate 718 only if uop1 is guaranteed, uop1 is not explicitly writing to ZF, and no other higher priority uop (uop3, uop2) either implicitly or explicitly writes to ZF. The write enable signal for the implicit write operation to ZF of uop1 (WEZF1I) is asserted by AND gate 722 only if uop1 is guaranteed and no other higher priority uop (uop3, uop2) either implicitly or explicitly writes to ZF. The write enable signal for the explicit write operation to ZF of uop0 (WEZF0E) is asserted by AND gate 724 only if uop0 is guaranteed and no other higher priority uop (uop3, uop2, uop1) either implicitly or explicitly writes to ZF. The write enable signal for the implicit write operation to ZF of uop0 (WEZF0I) is asserted by AND gate 726 only if uop0 is guaranteed, uop0 is not explicitly writing to ZF, and no other higher priority uop (uop3, uop2, uop1) either implicitly or explicitly writes to ZF.

Therefore, from among the eight possible write enable signals (i.e., four explicit and four implicit) for the ZF bit, only one will be active at any given time for a given set of retiring uops. It is appreciated that the logic of FIG. 7(A) is replicated within the present invention write logic 45 for each bit within the EFLAGS register 67. For each bit, the enable inputs 531, 541, 551, and 561 are the same for the retiring uops. However, a different enable flag bit is used from the implicit decoder outputs. For instance, to realize the logic for the SF bit, the SF bits of the decoder outputs 440(D) through 440(A) replace the signals 460(D) through 460(A) of FIG. 7(A). The guarantee bits remain the same as well as the signals 531, 541, 551, and 561. The resulting write enable outputs are then specified for the sign flag (SF) of the EFLAGS register 67. The above is replicated for each flag bit of register 67.

Figure 7B:
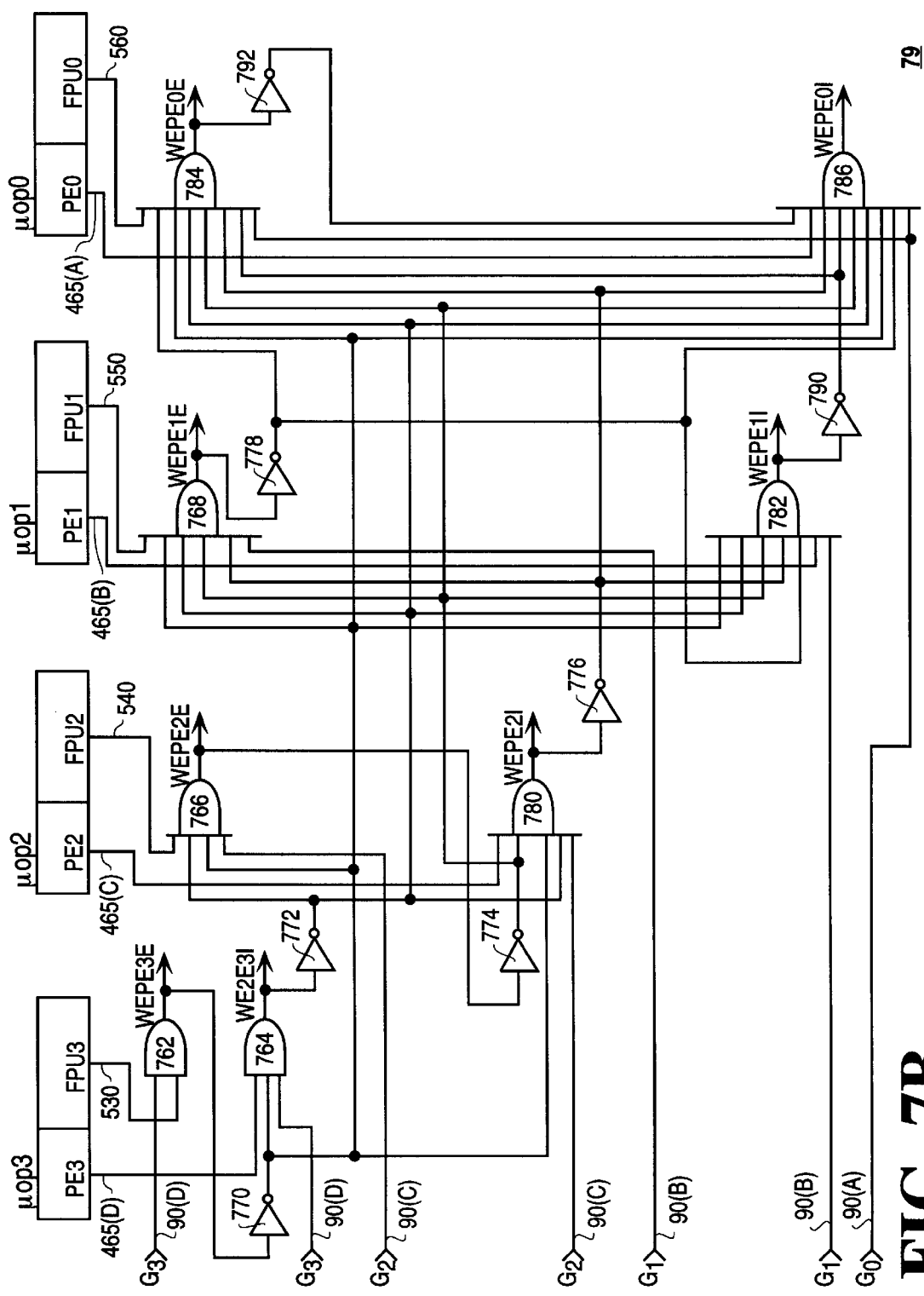
FIG. 7(B) illustrates the priority logic of the priority stage of the present invention required to generate the write enables for the precision exception flag of the floating point unit register, including explicit and implicit write conditions.

FIG. 7(B) illustrates the portion of the priority logic of the priority stage 79 of the present invention that determines the implicit and explicit write enable signals for the precision exception flag of the floating point status register 69. The logic of FIG. 7(B) may also be used in similar fashion to realize the explicit and implicit write enables for other flag bits of the FPU status register. Since each flag bit of the flag registers may be either implicitly or explicitly updated, each flag bit of the FPU must have two separate sets of write enables. One set of four are the explicit write enables corresponding to each possible retiring uop and the other set of four are the implicit write enables corresponding to each possible retiring uop. Priority logic of the priority stage 79 for flag bits must maintain priority across both implicit and explicit write operations and also must maintain priority across the various uops. FIG. 7(B) illustrates the circuitry of the present invention write logic 45 that accomplishes the above priority for the precision exception bit of the FPU status register 69. The four guarantee bits 90(A) to 90(D) from bus 90 are input for uop0 to uop3. Explicit write requests for each of the retiring uops are input via lines 530, 540, 550, and 560 and are supplied from the merge stage 77. Implicit write requests from each of the retiring uops are input for each bit via the implicit decoder outputs 440(A)–440(D). A particular bit for each uop of the decoder outputs is shown as 465(A)–465(D).

Refer still to FIG. 7(B). The write enable signal WEPE3E is the write enable for the explicit write to all bits of the FPU status register 69, which includes the precision exception flag bit (PE). It will be asserted if the FPU3 signal 530 is active and if uop3 is guaranteed. Signals 530, 540, 550, and 560 are explicit write enables which target an entire register. The write enable signal for the implicit write operation to the PE flag for uop3 is WEPE3I. This signal can only be asserted if an implicit update for the PE is required by uop3, an explicit write the FPU is not requested by uop3 as specified by the flag mask, and uop3 is guaranteed. Explicit write operations take priority over implicit write operations to a given flag bit for a given retiring uop. The PE3 signal over line 465(D) originates from the implicit decoder output 440(D).

The write enable for the explicit write operation to PE of uop2 (WEPE2E) is asserted by AND gate 766 only if uop2 requests an explicit write to FPU (i.e., line 540 is asserted), uop3 is not explicitly writing to PE, uop3 is not implicitly writing to PE, and uop2 is guaranteed. Likewise, the write enable for the implicit write operation to PE of uop2 (WEPE2I) is asserted by AND gate 780 if uop2 requests an implicit write to PE (i.e., line 465(C) is asserted), uop2 is not requesting an explicit write to FPU, uop3 is not explicitly writing to PE, uop3 is not implicitly writing to PE, and uop2 is guaranteed. Under the same rationale, the write enable signal for the explicit write operation to PE of uop1 (WEPE1E) is asserted by AND gate 768 only if uop1 is guaranteed and no other higher priority uop (uop3, uop2) either implicitly or explicitly writes to PE. The write enable signal for the implicit write operation to PE of uop1 (WEPE1I) is asserted by AND gate 782 only if uop1 is guaranteed, uop1 is not explicitly writing to PE, and no other higher priority uop (uop3, uop2) either implicitly or explicitly writes to PE. The write enable signal for the explicit write operation to PE of uop0 (WEPE0E) is asserted by AND gate 784 only if uop0 is guaranteed and no other higher priority uop (uop3, uop2, uop1) either implicitly or explicitly writes to PE. The write enable signal for the implicit write operation to PE of uop0 (WEPE0I) is asserted by AND gate 786 only if uop0 is guaranteed, uop0 is not explicitly writing to PE, and no other higher priority uop (uop3, uop2, uop1) either implicitly or explicitly writes to PE.

Therefore, from among the eight possible write enable signals (i.e., four explicit and four implicit) for the PE bit, only one will be active at any given time for a given set of retiring uops. It is appreciated that the logic of FIG. 7(B) is replicated within the present invention write logic 45 for each bit within the FPU status register 69. For each bit, the enable inputs 530, 540, 550, and 560 are the same for the retiring uops. However, a different enable flag bit is used from the implicit decoder outputs. For instance, to realize the logic for the overflow exception (OE) bit, the OE bits of the decoder outputs 440(D) through 440(A) replace the signals 465(D) through 465(A) of FIG. 7(B). The guarantee bits remain the same as well as the signals 530, 540, 550, and 560. The resulting write enable outputs are then specified for the overflow exception (OE) of the FPU status register 69. The above is replicated for each flag bit of register 69.

Figure 8A:
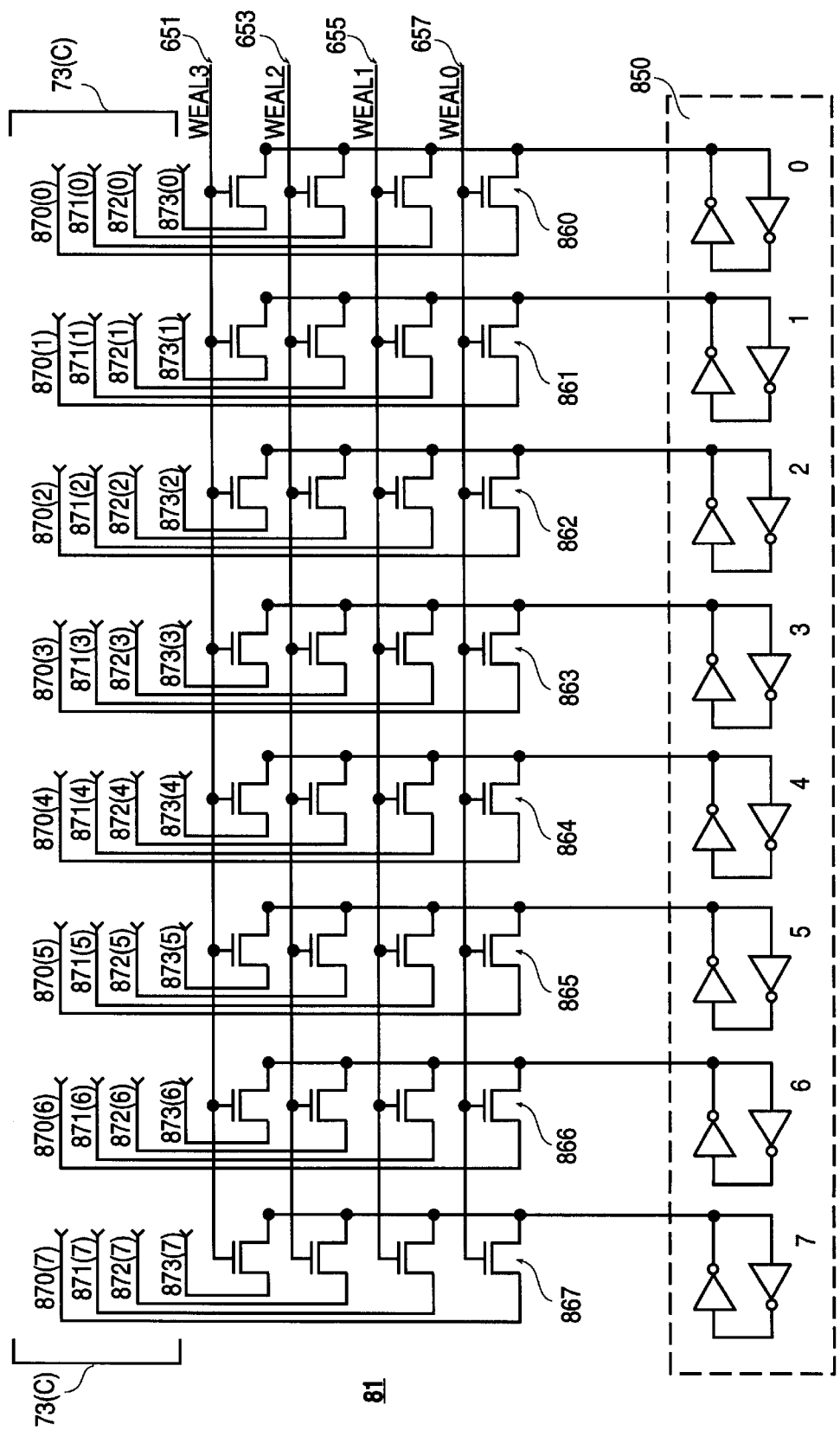
FIG. 8(A) illustrates the enable logic of the enable stage of the present invention for steering data from the data field of the storage queue that holds the retiring uops to the bits of the AL register of the register file.

FIG. 8(A) illustrates the portion of the enable logic of the enable stage 81 of the present invention that creates the data pathway from the data in the entries of the data field 73(C) for individual uops to the 8-bit AL register 850. This register 850 resides in the real register file 83. The logic of FIG. 8(A) may also be used in similar fashion to realize the logic required to create the data pathway from the data in the entries of the data field 73(C) to the other arithmetic registers of the real register file 83. The eight bits of the AL arithmetic register 850 are shown individually in standard logic form as pairs of inverter gates configured as bit registers (numbered 0 to 7). Each bit has an associated set of four enable gates from units 860–867 respectively. For each set of four gates, only one enable gate will be turned on for any given set of retiring uops. The "on" gate will channel data from the queue 73 to the associated register bit for the selected priority uop.

The lower eight bits of the data in the data field 73(C) associated with uop0 are transferred to the enable gates via signals 870(0)–870(7). The lower eight bits of the data in the data field 73(C) associated with uop1 are transferred to the enable gates via signals 871(0)–871(7). Also, the lower eight bits of the data in the data field 73(C) associated with uop2 are transferred to the enable gates via signals 872(0)–872(7). Lastly, the lower eight bits of the data in the data field 73(C) associated with uop3 are transferred to the enable gates via signals 873(0)–873(7). The above signals are the data input signals that originate from the queue 73 of the write logic of the present invention and are brought in via bus 91.

The explicit write operations to the arithmetic registers are not bit addressable. Thus, the explicit write operations will write to a byte or a word of the register file depending on the size of the register. The write enable signals for AL write to a byte of data. Therefore, as shown in FIG. 8(A), the write enable signals for the AL register for a given retiring uop are routed to each set of four enable gates 860–867. The write enable signals for the AL registers are WEAL0 657, WEAL1 655, WEAL2 653, and WEAL3 651 and are generated from the logic of FIG. 6(A). These write enable signals are the product of the priority stage 79 of the present invention write logic 45 and supplied to the enable stage via bus 96. Only one write enable may be asserted for any set of retiring uops. It is appreciated that the enable sets 860–867 are coupled to the individual bits of the registers of the register file 83 via bus 94.

Referring still to FIG. 8(A), if signal 651 is asserted, then the enable sets 860–867 will individually channel the lowest eight bits from the data field 73(C) that correspond to the entry for uop3 into register AL 850. When signal 653 is asserted, the lowest eight bits of the data field entry for uop2 will be channeled into AL 850. When signal 655 is asserted, the lowest eight bits of the data field entry for uop1 will be channeled into AL 850. When signal 657 is asserted, the lowest eight bits of the data field entry for uop0 will be channeled into AL 850. It is appreciated that the logic of FIG. 8(A) is replicated for each and every register within the register file 83 and adjusted accordingly for differing length registers. For instance, if the register AH is targeted, the AH write enable signals (see FIG. 6(B)) are input and the data arrives from the upper eight bits of the lower word of the data field 73(C) and is stored into register AH. If EAX is targeted, then the enable logic stage 81 receives write enables for AL, AH and EAX (high word), see FIG. 6(C) for EAX write enables. Therefore, AL is loaded, AH is loaded and the high word of EAX is loaded simultaneously thus completing the 32-bit register. It is appreciated that the write enable signal for EAX (high word) corresponds to the upper 16 bits of the EAX register. If the register AX is targeted, then both AL and AH will be active to load the lower word of the EAX register simultaneously using separate write enable signals for AL and AH. The enable logic of the present invention is constructed such that each of the entries of the data field 73(C) may be routed to any of the arithmetic registers within the real register file 83.

Figure 8B:
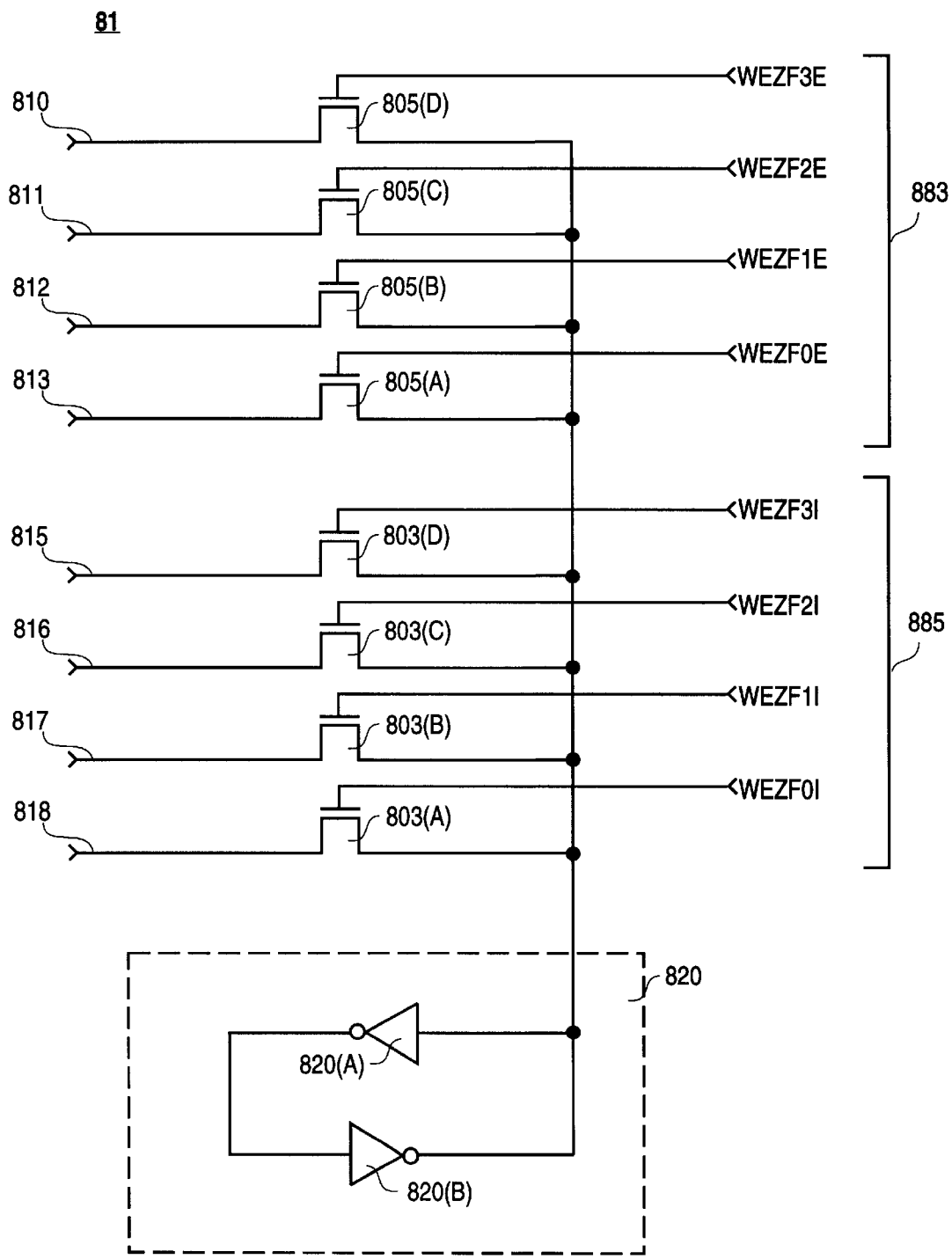
FIG. 8(B) illustrates the enable logic of the enable stage of the present invention for steering data from the flags field or the data field of the storage queue to the zero flag bit of the EFLAGS register.

FIG. 8(B) illustrates the portion of the enable logic of the enable stage 81 of the present invention that creates the data pathway from the data in the entries of the data field 73(C) or the entries of the flag field 73(A) to the 1 bit zero flag 820 of the EFLAG register 67. This register 67 resides in the real register file 83. The logic of FIG. 8(B) may also be used in similar fashion to realize the logic required to create the data pathway from the data in the entries of the data field 73(C) or the flag field 73(A) to the other bits of the EFLAG register 67 of the real register file 83. It is noted that the implicit write enable inputs 885 correspond to a single bit, not a byte or word as in FIG. 8(A), however, the explicit write enable inputs 883 are used for every bit of the EFLAG register 67.

Since bits of the EFLAG register may be both explicitly or implicitly set, two sets of four enable signals must be utilized. It is appreciated that only one write enable signal of 883 and 885 will be active for any given set of retiring uops. The zero flag bit 820, as well as any other flag bit of register 67, will receive its data from the data field 73(C) for an explicit write and from the flag field 73(A) for an implicit write operation. The explicit write enables 883 for the zero flag 820 are generated according to FIG. 7(A). They are input over bus 96. These signals 883 are coupled to the enable logic for each bit of the EFLAG register 67. If WEZF3E is active, the bit data is passed to 820 from data field 730(C) for entry uop3 corresponding to the bit location for the ZF flag position. Likewise, if WEZF2E is active, the bit data is passed to 820 from data field 730(C) for entry uop2 corresponding to the bit location for the ZF flag position. If WEZF1E or WEZF0E is active, the bit data is passed to 820 from data field 730(C) for entry uop1 or uop0, respectively, corresponding to the bit location for the ZF flag position. Signal lines 810–813 correspond to the entries for uop3 to uop0 respectively within data field 73(C).

Referring still to FIG. 8(B), the implicit write enable signals 885 for the ZF bit 820 for each uop are produced according to FIG. 7(A). The data sources for the implicit write operations origination from the entries of the flag field 73(A) for each uop. Signal 815, 816, 817, and 818 correspond the entries for uop3, uop2, uop1, and uop0, respectively. If WEZF3I is active then the bit data originates from 73(A) for uop3. If WEZF2I is active then the data originates from 73(A) for uop2. Lastly, if WEZF1I or WEZF0I is active, the bit data originates from uop1 or uop0 respectively. The bit 820 is coupled to the enable sets via bus 94. It is appreciated that the above logic is replicated within the present invention to cover each flag bit within the EFLAG register 67.

Figure 8C:
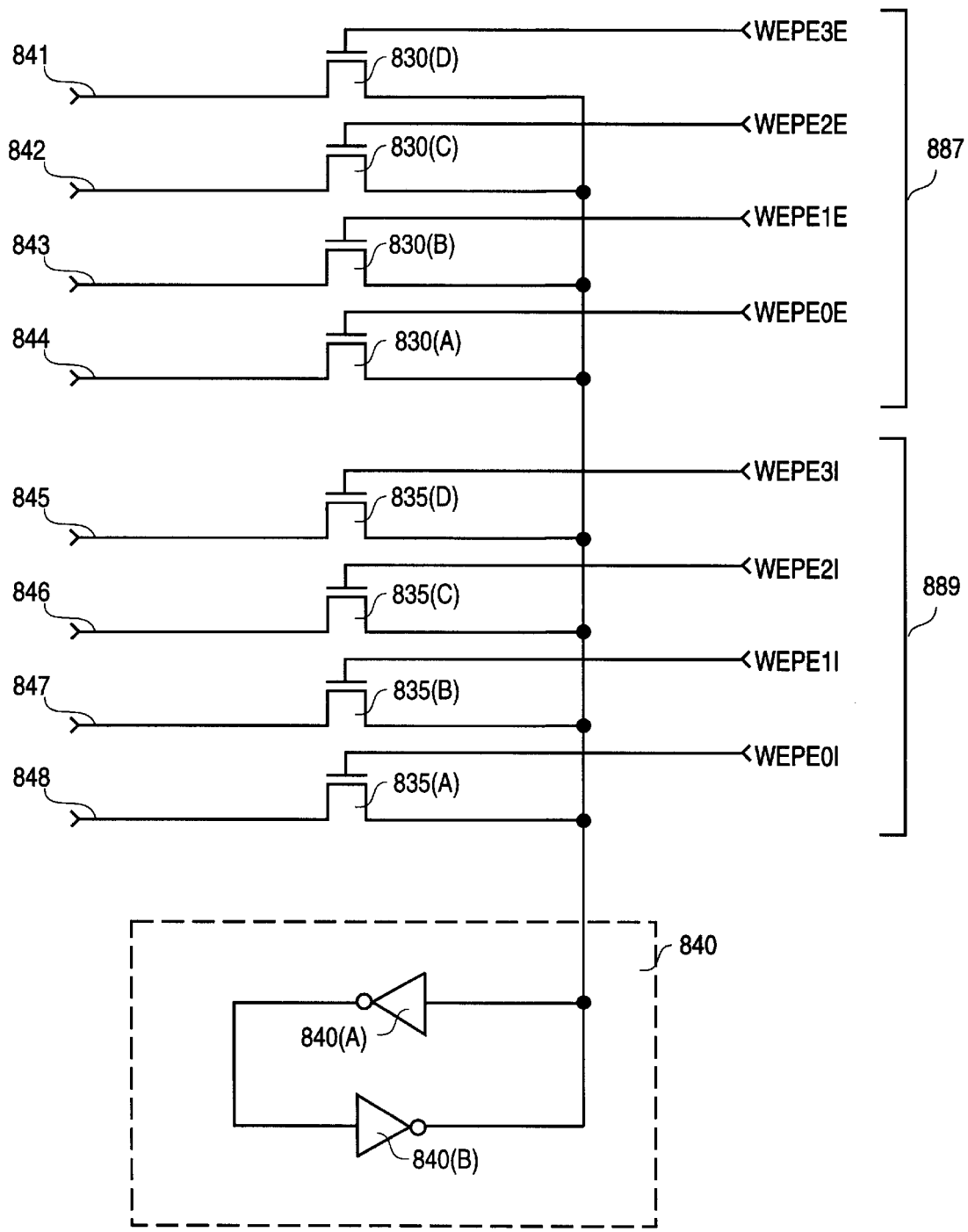
FIG. 8(C) illustrates the enable logic of the enable stage of the present invention for steering data from the flags field or the data field of the storage queue to the precision exception bit of the floating point unit register.

FIG. 8(C) illustrates the portion of the enable logic of the enable stage 81 of the present invention that creates the data pathway from the data in the entries of the data field 73(C) or the entries of the flag field 73(A) to the 1 bit precision exception of the FPU status register 69. This register 69 resides in the real register file 83. The logic of FIG. 8(C) may also be used in similar fashion to realize the logic required to create the data pathway from the data in the entries of the data field 73(C) or the flag field 73(A) to the other bits of the FPU status register 69 of the real register file 83. It is noted that the implicit write enable inputs 889 correspond to a single bit, not a byte or word as in FIG. 8(A), however, the explicit write enable inputs 887 are used for every bit of the FPU status register 69.

Since bits of the FPU status register may be both explicitly or implicitly set, two sets of four enable signals must be utilized. It is appreciated that only one write enable signal of 887 and 889 will be active for any given set of retiring uops. The precision exception flag bit 840, as well as any other flag bit of register 69, will receive its data from the data field 73(C) for an explicit write and from the flag field 73(A) for an implicit write operation. The explicit write enables 887 for the precision exception (PE) flag 840 are generated according to FIG. 7(B). They are input over bus 96. These signals 887 are coupled to the enable logic for each bit of the FPU status register 69. If WEPE3E is active, the bit data is passed to 840 from data field 730(C) for entry uop3 corresponding to the bit location for the PE flag position. Likewise, if WEPE2E is active, the bit data is passed to 840 from data field 730(C) for entry uop2 corresponding to the bit location for the PE flag position. If WEPE1E or WEPE0E is active, the bit data is passed to 840 from data field 730(C) for entry uop1 or uop0, respectively, corresponding to the bit location for the PE flag position. Signal lines 841–844 correspond to the entries for uop3 to uop0 respectively within data field 73(C).

Referring still to FIG. 8(C), the implicit write enable signals 889 for the PE bit 840 for each uop are produced according to FIG. 7(B). The data sources for the implicit write operations origination from the entries of the flag field 73(A) for each uop. Signal 845, 846, 847, and 848 correspond the entries for uop3, uop2, uop1, and uop0, respectively. If WEPE3I is active then the bit data originates from 73(A) for uop3. If WEPE2I is active then the data originates from 73(A) for uop2. Lastly, if WEPE1I or WEPE0I is active, the bit data originates from uop1 or uop0 respectively. The bit 840 is coupled to the enable sets via bus 94. It is appreciated that the above logic is replicated within the present invention to cover each flag bit within the FPU status register 69.

Error Summary Bit. In addition, the present invention write enable logic 45 also includes circuitry for setting the proper status of the error summary bit of the FPU status register 69 within the register file 83. The result of the FPU status register is the logical OR of all the exception flags of the FPU, such as precision, underflow, overflow, zero divide, denormalized operand, and invalid operation. The present invention includes an OR gate to generate the error summary bit (ES) of the resultant FPU of the real register file once the decode, merge, priority and enable stages determine the resultant state of the FPU status register 69. According to the present invention, the signals from each bit of the real register file that correspond to the resulting exception flags are fed to an OR gate and the output of this gate is then fed to set the error summary bit (ES) of the FPU status register 69. Any other summary bits for the flag registers are treated in like fashion within the present invention priority merge and override write logic 45.

It is appreciated that the present invention write logic 45 has been disclosed above in terms of retiring four micro-ops at most per clock cycle. However, it should be appreciated that the present invention is not limited to such capability. Using extensions of the logic schemes disclosed by the present invention, the circuitry required to write merge and override more than four uops per clock cycle can be realized within the scope and spirit of the present invention. It is appreciated that the logic of the present invention as described and illustrated herein is sufficient to process uop write operation in the case when less than three uops retire within a given set of retiring uops.

Microprocessor of the Present Invention

Figure 9:
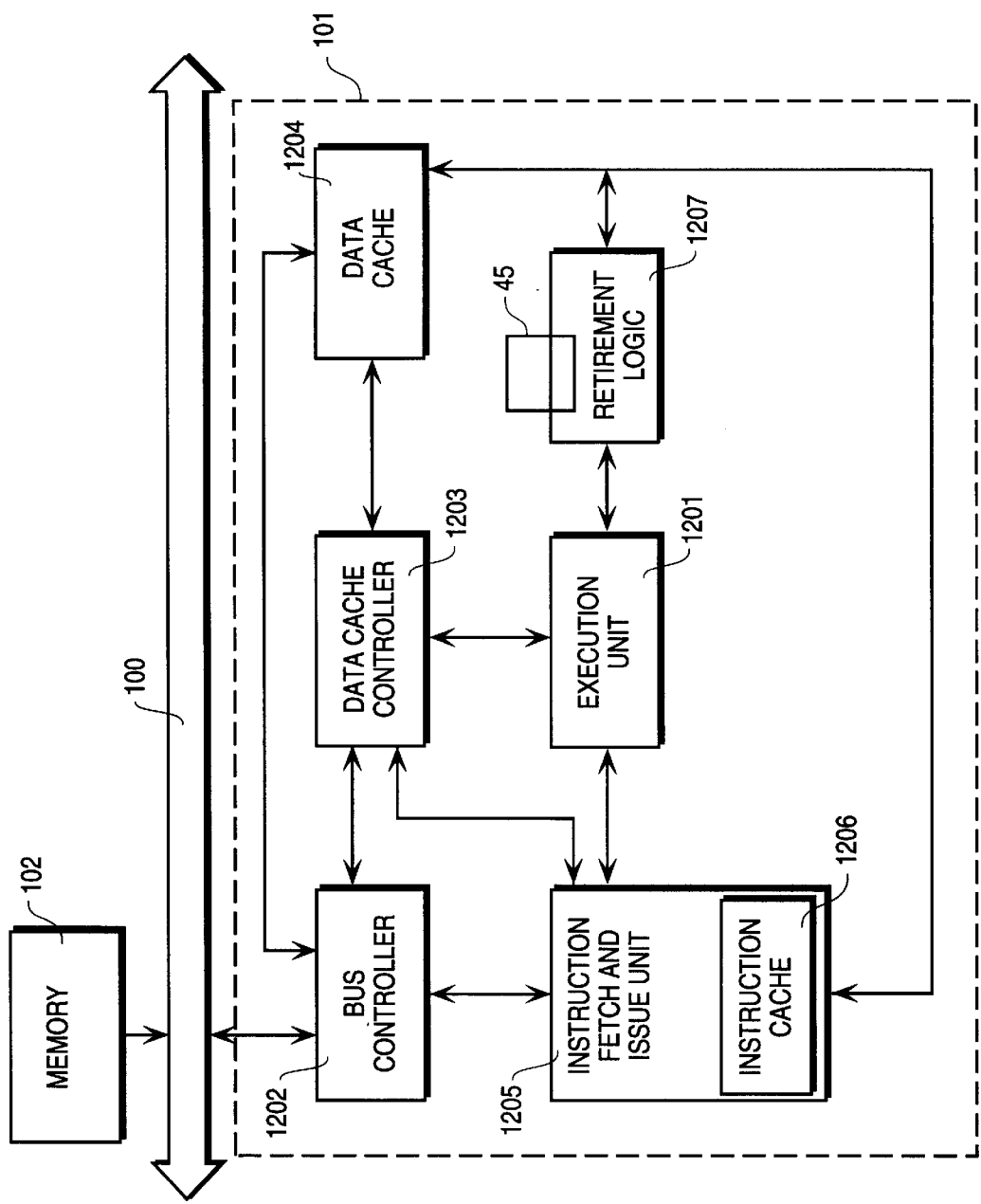
FIG. 9 illustrates a microprocessor embodiment of the present invention including a retirement unit which utilizes the write merge and override logic embodiment of the present invention.

Referring now to FIG. 9, a block diagram illustrating an exemplary superscalar and pipeline processor 101 incorporating the teachings of the present invention is shown. The exemplary processor 101 comprises an execution unit 1201, a bus controller 1202, a data cache controller 1203, a data cache 1204, and an instruction fetch and issue unit 1205 with an integrated instruction cache 1206. The elements 1201–1206 are coupled to each other as illustrated. Together they cooperate to fetch, issue, execute, and save execution results of instructions in a pipelined manner. It is appreciated that a number of instructions may be executed at the same time. It is further appreciated that the microprocessor of the present invention may be implemented in a variety of different architectures, including Alpha and PowerPC architectures. The architecture of FIG. 9 is presented for example. Further, the microprocessor 101 of the present invention may be implemented using a number of substrates including silicon or gallium arsenide and may also be implemented in a single chip or with several different chips.

The instruction fetch and issue unit 1205 fetches instructions from an external memory 102 through the bus controller 1202 via an external system bus 100. Bus controller 1202 manages transfers of data between external components and processor 101. In addition, it also manages cache coherency transfers. The instruction fetch and issue unit 1205 then issues these instructions (in sets) to the execution unit 1201 in an in-order sequence. Generally, the execution unit 1201 performs such functions as add, subtract, logical AND, and integer multiply. Some of these instructions are fetched and issued speculatively. The execution unit 1201 holds and executes the integer and floating point instructions when their operand dependencies on execution results of preceding instructions are resolved. This includes those integer and floating point instructions that are speculatively fetched and issued. In similar fashion, the execution unit 1201 holds and forwards the load and store instructions to the retirement logic 1207. Retirement logic 1207 commits the states of these instructions to whatever permanent architectural state that was designated by the original source code. The priority merge and override logic 45 of the present invention resides within the retirement logic block 1207 as shown.

Referring to FIG. 9, data cache controller 1203 controls the access of data to/from the data cache 1204. Data cache 1204 is a fast, small, hardware-maintained scratchpad memory which can be reached in fewer clock cycles than main memory by loads and stores. The data cache controller 1203 and the data cache 1204 respond to the load instructions immediately, forwarding data if necessary. In contrast, store instructions are buffered. In other words, instructions are not necessarily executed/forwarded in the order they were issued. Moreover, some instructions are speculatively executed/forwarded. In any case, the execution results of the integer, floating point, and load instructions are buffered, and then retired or committed in order. In comparison, the buffered store instructions are retired or committed in order and then executed in the "background," at the convenience of the memory system. Speculative integer, floating point, and load execution results and buffered stores of mispredicted branches are purged.

The instruction fetch and execution unit 1205 is intended to represent a broad category of instruction fetching and issuing elements found in many computer systems. Their constitutions and functions are well known and will not be further described. In the presently preferred embodiment, the instruction fetch and issue unit 1205 includes an instruction cache 1206. The instruction cache 1206 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 1205 to decide which instruction cache entry ought to be accessed next for maximal program performance. In the currently preferred embodiment, the instruction cache 1206 and data cache 1204 exists in a memory hierarchy.

The hierarchy is comprised of a small but extremely fast L1 cache. If a memory access to the L1 cache results in a miss, the access is passed on to a bigger, but slower, L2 cache. And if that also results in a miss, the memory access goes to the L3 cache or to the main memory if the processor happens to not have an L3 cache. The data cache controller 1203 is used for page miss handling. Furthermore, there is no requirement for the instructions to be fetched from aligned memory locations. In other words, an instruction may be fetched from memory locations spanning two cache lines. However, it will be appreciated that the present invention may be practiced with or without an instruction cache, or with a combined instruction/data cache. If an instruction cache is implemented, page misses may be handled by a dedicated page miss handler, and instructions may be fetched from aligned memory locations.

Within the retirement logic 1207, the microprocessor 101 of the present invention receives data write commands from a set of uops that must be updated to the retirement register file (also located in 1207). This data is written into the retirement register file 83 by logic 45 using the methods and mechanisms of the present invention as discussed above.

Computer System of the Present Invention

The present invention write logic 45 is implemented within a general purpose superscalar microprocessor 101 also of the present invention. Any general purpose microprocessor that is capable of writing two or more micro-op results into the register file within the same clock cycle may take advantage of the write merge and override features of the present invention write logic 45. Specifically, the superscalar microprocessor utilized in conjunction with the write logic 45 is capable of writing four micro-op results (i.e., retire) into the register file within one clock cycle. The general purpose microprocessor 101 functions to execute instructions and process data. The write logic 45 acts to efficiently write the results of retiring uops into the real register file of the microprocessor 101. FIG. 10 illustrates a general purpose computer system 112 of the present invention that has as an integral component the general purpose superscalar microprocessor 101 of the present invention.

Referring still to FIG. 10, the computer system 112 within the present invention as illustrated in block diagram format. This computer system 112 comprises a bus 100 for communicating information, the superscalar central processor 101 coupled with the bus 100 for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic disk and disk drive coupled with the bus 100 for storing information and computer program code instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the superscalar processor 101. A hardcopy device 109 may also be coupled to the bus 100 for generation a hardcopy visual rendition of computer data, such as on paper. A communication device 110, such as a modem or local area network interface may be coupled to the bus 100 to allow the computer system 112 of the present invention to communicate with other external devices. The data input device 106 may also be a stylus and pad for pen based computer systems.

With reference still to FIG. 10, the display device 105 utilized with the computer system 112 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. It is further appreciated that a system board or "motherboard" 10 may be constructed of RAM 102, ROM 103, storage device 104, bus 100 and the central processor 101.

In operation, the computer system 112 embodiment of the present invention processes data which flows across bus 100. Program code stored in RAM 102 or ROM 103 is read by the central processor 101 according the order of instructions of the code and then executed by several execution units of the central processor. Results of the executions (which may occur out of order) are then written back into the registers of the register file 83 by the write merge and override logic 45 embodiment of the present invention. The write back operation occurs according to program code order for a given set of retiring uops. Once the data results are placed into the register file 83, they may be moved into RAM 102 by appropriate instructions that read the register file 83 and execute memory write operations from the central processor 101 to the RAM 102 over the bus 100. Results from the register file 83 so stored in RAM 102 may then be updated to the display 105 via the bus 100 (as in a frame buffer memory) or may be printed on paper via the hardcopy device 109 again via data transmission over the bus 100. These results may also be transferred directly from the register file 83 into an I/O port that transmits the data over bus 100 to the communication device 100 or transferred directly for storage into the storage device 104.

The preferred embodiment of the present invention, a mechanism and method within a superscalar microprocessor for storing, into a register file, the results of up to four micro-ops (that become available for storage at the same) within a single clock cycle and therefore avoid stalling the superscalar microprocessor, is thus described. While the present invention has been described in particular embodiments, it should be appreciated that the present invention should not be construed as limited by such embodiments, but rather construed according to the below claims.

What is claimed is:

1. An apparatus for storing execution results into a register file, said register file containing a plurality of registers, said apparatus comprising:

means for receiving results corresponding to a set of operations, said results targeting multiple registers and different register parts of a same register of said register file;

means for data merging results of individual operations targeting differing parts of a same register;

means for data prioritizing results of individual operations that target a same register part, said means for data prioritizing coupled to said means for data merging; and means for writing said results of said set of operations into targeted registers of said register file, said means for writing responsive to said means for data prioritizing;

wherein said means for data merging, said means for data prioritizing, and said means for writing operate in combination to write said results into said register file within one half clock cycle.

2. An apparatus for storing execution results into a register file as described in claim 1 wherein said means for receiving comprises queue means for temporarily storing said results, and wherein an individual entry of said results corresponds to a particular operation and comprises a data field and a destination field for targeting a particular register.

3. An apparatus for storing execution results into a register file as described in claim 2 wherein said means for writing said results of said set of operations comprises:

means for enabling said registers of said register file to accept said results, said means for enabling coupled to said queue means and coupled to said register file.

4. An apparatus for storing execution results into a register file as described in claim 3 wherein said means for enabling further comprises means for creating a data pathway between a data field entry of said queue means and a particular targeted register of said register file.

5. An apparatus for storing execution results into a register file as described in claim 3 wherein said set of operations is a set of retiring operations that retire within a given clock cycle of a superscale microprocessor device.

6. An apparatus for storing execution results into a register file as described in claim 1 wherein said means for data merging comprises means for generating an enable signal corresponding to an 8-bit register if any result of an operation within said results targets a larger register that includes said 8-bit register.

7. An apparatus for storing execution results into a register file as described in claim 1 wherein said means for data prioritizing comprises means for awarding priority to operations based on program code order of said set of operations.

8. An apparatus for storing execution results into a register file as described in claim 2 wherein said means for writing comprises means for enabling said registers of said register file to accept said results, said means for enabling coupled to said queue means and also coupled to said register file, and wherein said means for enabling is responsive to said means for data prioritizing.

9. An apparatus for storing execution results into a register file as described in claim 7 wherein said means for data prioritizing comprises means for prioritizing results of said set of operations that target a same flag bit of a flag register of said register file for both explicit and implicit write operations.

10. An apparatus for storing results of an executed set of operations into a register file within one clock cycle, said set of operations executed by a superscalar microprocessor, said register file having a plurality of registers of varying size, said apparatus comprising:

merging means for generating separate enable signals corresponding to a first register portion for individual operations of said set of operations that target a destination register that includes said first register portion;

priority means for generating separate write enable signals corresponding to said first register portion for individual operations of said set of operations that target said first register portion to contain result data, said priority means generating an asserted write enable signal corresponding to said first register portion for a highest priority operation that targets said first register portion; and enable means for steering data of said results to said first register portion within said register file for said highest priority operation that targets said first register portion, said enable means coupled to receive said asserted write enable signal and coupled to said register file, and wherein said priority means and said enable means are operable within said one clock cycle to process at least two operations that target register portions of a same destination register.

11. An apparatus for storing results of an executed set of operations into said register file as described in claim 10 further comprising:

storage means for receiving results of said set of operations for storage into said register file, said results of said set of operations comprising, for each operation of said set, a flag field; a destination register field; and a data field, wherein said first register portion is indicated by either said flag field or said destination register field.

12. An apparatus for storing results of an executed set of operations into said register file as described in claim 11 wherein said set of operations is a retiring set of operations whose individual data fields require storage into said register file within one clock cycle.

13. An apparatus for storing results of an executed set of operations into said register file as described in claim 11 wherein said enable means comprises gate means for receiving write enable signals corresponding to said first register portion for individual operations of said set of operations and for steering data from said data field corresponding to said high priority operation to said first register portion of said register file, said gate means coupled to said data field and also coupled to said register file.

14. An apparatus for storing results of an executed set of operations into said register file as described in claim 10 further comprising event logic means for generating individual guarantee bits for said operations of said set of operations, said guarantee bits indicating that a particular operation is guaranteed to write results into said register file.

15. An apparatus for storing results of an executed set of operations into said register file as described in claim 14 wherein said priority means includes means for ignoring priority of individual operations of said set of operations if an associated guarantee bit is not asserted, said priority means coupled to said event logic means to receive said guarantee bits.

16. An apparatus for storing results of an executed set of operations into said register file as described in claim 10 wherein said first register portion is an 8-bit register and wherein said merging means comprises means for generating separate enable signals corresponding to said 8-bit register for individual operations that target a 32-bit destination register that includes said 8-bit register or for individual operations that target a 16-bit register that includes said 8-bit register.

17. An apparatus for storing results of an executed set of operations into said register file as described in claim 10 wherein said set of operations has an associated program code order and wherein said priority means comprises means for assigning priority to said set of operations based on said program code order.

18. An apparatus for storing results of an executed set of operations into said register file as described in claim 10 wherein said priority means comprises flag priority means for generating write enable signals corresponding to a flag bit of a flag register for individual operations of said set of operations that target said flag bit wherein said individual operations may be explicit write operations or implicit write operations.

19. An apparatus for storing results of multiple executed uops into a register file within one clock cycle, said uops executed by a superscalar microprocessor, said register file having a plurality of registers, said apparatus comprising:

memory logic for receiving names of a first destination register and a second destination register, said first destination register targeted by a first uop and said second destination register larger than said first destination register and targeted by a second uop;

merging logic for generating an enable signal for said second uop that corresponds to said first destination register if said second destination register includes said first destination register;

priority logic for asserting a write enable signal corresponding to said first destination register for a highest priority uop between said first and said second uop, if said first and said second uop have enable signals corresponding to said first destination register; and enable logic for steering data associated with said highest priority uop from said memory logic to said first destination register of said register file according to said write enable signal within said one clock cycle.

20. An apparatus for storing results of an executed set of uops into said register file as described in claim 19 wherein said first uop and said second uop are of a retiring set of uops and said data associated with said first and said second uop require storage into said register file within one clock cycle.

21. An apparatus for storing results of an executed set of uops into said register file as described in claim 20 wherein said enable logic comprises gate logic for receiving individual write enable signals corresponding to said first destination register for said first and said second uop and for steering said data from a data entry corresponding to said high priority uop to said first destination register, said gate logic coupled to said memory logic and also coupled to said register file.

22. An apparatus for storing results of an executed set of uops into said register file as described in claim 19 further comprising event logic for generating individual guarantee signals for said first and said second uop, said guarantee signals indicating that said first or said second uop is guaranteed to write results into said register file.

23. An apparatus for storing results of an executed set of uops into said register file as described in claim 22 wherein said priority logic comprises logic for ignoring priority of said first and said second uop if an associated guarantee signal is not asserted, said priority logic coupled to said event logic to receive said guarantee signals.

24. An apparatus for storing results of an executed set of uops into said register file as described in claim 19 wherein said first destination register is an 8-bit register and said second destination register is a 32-bit register and wherein said merging logic comprises logic for generating an enable signal corresponding to said 8-bit register for said second uop if said 32-bit register of said second uop includes said 8-bit register.

25. An apparatus for storing results of an executed set of uops into said register file as described in claim 19 wherein said first and said second uop have an associated program code order and wherein said priority logic comprises logic for assigning priority to said first and said second uop based on said program code order.

26. An apparatus for storing results of an executed set of operations into said register file as described in claim 19 wherein said priority logic comprises:

flag priority logic for generating explicit write enable signals corresponding to a flag bit of a flag register for said first or said second uop if said first or said second uop explicitly targets said flag bit; and flag priority logic for generating implicit write enable signals corresponding to said flag bit for said first or said second uop if said first or said second uop implicitly targets said flag bit.

27. A general purpose computer system comprising:

bus means for providing communication pathways within said computer system; memory means coupled to said bus means for storage of information and instructions; input/output means coupled to said bus means for receiving and transmitting information; and a processor means coupled to said bus means for executing operations to process information, said processor means further comprising a write logic means for storing results of multiple executed uops into a register file within one clock cycle, said register file having a plurality of registers of varying size, said write logic means comprising:

(a) queue means for receiving names of a first destination register and a second destination register, said first destination register targeted by a first uop and said second destination register larger than said first destination register and targeted by a second uop;

(b) merging means for generating an enable signal for said second uop that corresponds to said first destination register if said second destination register includes said first destination register;

(c) priority means for asserting a write enable signal corresponding to said first destination register for a highest priority uop between said first uop and said second uop, if said first and said second uop have enable signals corresponding to said first destination register; and (d) enable means for steering data associated with said highest priority uop from said queue means to said first destination register of said register file according to said write enable signal within said one clock cycle.

28. A general purpose computer system as described in claim 27 wherein said first uop and said second uop are of a retiring set of uops and said data associated with said first and said second uop requires storage into said register file within one clock cycle.

29. A general purpose computer system as described in claim 28 wherein said enable means comprises gate means for receiving individual write enable signals corresponding to said first destination register for said first and said second uop and for steering said data from a data entry corresponding to said high priority uop to said first destination register, said gate means coupled to said queue means and also coupled to said register file.

30. A general purpose computer system as described in claim 27 further comprising event means for generating individual guarantee bits for said first and said second uop, said guarantee bits indicating that said first or said second uop is guaranteed to write results into said register file.

31. A general purpose computer system as described in claim 30 wherein said priority means comprises means for ignoring priority of said first and said second uop if an associated guarantee bit is not asserted, said priority means coupled to said event means to receive said guarantee bits.

32. A general purpose computer system as described in claim 27 wherein said first destination register is an 8-bit register and said second destination register is a 32-bit register and wherein said merging means comprises means for generating an enable signal corresponding to said 8-bit register for said second uop if said 32-bit register of said second uop includes said 8-bit register.

33. A general purpose computer system as described in claim 27 wherein said first and said second uop have an associated program code order and wherein said priority means comprises means for assigning priority to said first and said second uop based on said program code order.

34. A general purpose computer system as described in claim 27 wherein said priority means comprises:

flag priority means for generating explicit write enable signals corresponding to a flag bit of a flag register for said first or said second uop if said first or said second uop explicitly targets said flag bit; and flag priority means for generating implicit write enable signals corresponding to said flag bit for said first or said second uop if said first or said second uop implicitly targets said flag bit.

35. A method for storing results of multiple executed uops into a register file within one clock cycle, said uops executed by a superscalar microprocessor, said register file having a plurality of registers of varying size, said method comprising the steps of:

receiving names of a first destination register and a second destination register into a memory queue, said first destination register targeted by a first uop and said second destination register larger than said first destination register and targeted by a second uop;

generating an enable signal for said second uop that corresponds to said first destination register if said second destination register includes said first destination register;

determining priority by asserting a write enable signal corresponding to said first destination register for a highest priority uop between said first uop and said second uop if said first and said second uop have enable signals for said first destination register; and steering data associated with said highest priority uop from said memory queue to said first destination register of said register file according to said write enable signal within said one clock cycle, wherein said step of generating an enable signal and said step of determining priority are operable to store results of said first uop and said second uop into said register file within said one clock cycle.

36. A method of storing results of an executed set of uops into said register file as described in claim 35 wherein said first uop and said second uop are of a retiring set of uops and said data associated with said first and said second uop require storage into a same register, or portion thereof, of said register file within one clock cycle.

37. A method of storing results of an executed set of uops into said register file as described in claim 36 wherein said step of steering data comprises the step of receiving individual write enable signals corresponding to said first destination register for said first and said second uop and for steering said data from a data entry corresponding to said high priority uop to said first destination register.

38. A method of storing results of an executed set of uops into said register file as described in claim 35 further comprising the step of generating individual guarantee bits for said first and said second uop, said guarantee bits indicating that said first or said second uop is guaranteed to write results into said register file.

39. A method of storing results of an executed set of uops into said register file as described in claim 38 wherein said step of determining priority comprises the step of ignoring priority of said first and said second uop if an associated guarantee bit is not asserted.

40. A method of storing results of an executed set of uops into said register file as described in claim 35 wherein said first destination register is an 8-bit register and said second destination register is a 32-bit register and wherein said step of generating an enable signal for said second uop that corresponds to said first destination register comprises the step of generating an enable signal corresponding to said 8-bit register for said second uop if said 32-bit register of said second uop includes said 8-bit register.

41. A method of storing results of an executed set of uops into said register file as described in claim 35 wherein said first and said second uop have an associated program code order and wherein said step of determining priority comprises the step of assigning priority to said first and said second uop based on said program code order.

42. A method of storing results of an executed set of operations into said register file as described in claim 35 wherein said step of determining priority comprises the steps of:
generating explicit write enable signals corresponding to a flag bit of a flag register for said first or said second uop if said first or said second uop explicitly targets said flag bit; and
generating implicit write enable signals corresponding to said flag bit for said first or said second uop if said first or said second uop implicitly targets said flag bit.

43. A superscalar microprocessor comprising:
bus controller means for interfacing to an external bus means; instruction fetch and issue means coupled to said bus controller means; execution means for executing instructions coupled to said instruction fetch and issue means; and write logic means for storing results of multiple executed uops into a register file within one clock cycle, said register file having a plurality of registers of varying size, said write logic means comprising:
(a) queue means for receiving names of a first destination register and a second destination register, said first destination register targeted by a first uop and said second destination register larger than said first destination register and targeted by a second uop;
(b) merging means for generating an enable signal for said second uop that corresponds to said first destination register if said second destination register includes said first destination register;
(c) priority means for asserting a write enable signal corresponding to said first destination register for a highest priority uop between said first uop and said second uop, if said first and said second uop have enable signals corresponding to said first destination register; and
(d) enable means for steering data associated with said highest priority uop from said queue means to said first destination register of said register file according to said write enable signal within said one clock cycle.

44. A superscalar microprocessor as described in claim 43 wherein said first uop and said second uop are of a retiring set of uops and said data associated with said first and said second uop require storage into said register file within one clock cycle.

45. A superscalar microprocessor as described in claim 44 wherein said enable means comprises gate means for receiving individual write enable signals corresponding to said first destination register for said first and said second uop and for steering said data from a data entry corresponding to said high priority uop to said first destination register, said gate means coupled to said queue means and also coupled to said register file.

46. A superscalar microprocessor as described in claim 43 further comprising event means for generating individual guarantee bits for said first and said second uop, said guarantee bits indicating that said first or said second uop is guaranteed to write results into said register file.

47. A superscalar microprocessor as described in claim 46 wherein said priority means comprises means for ignoring priority of said first and said second uop if an associated guarantee bit is not asserted, said priority means coupled to said event means to receive said guarantee bits.

48. A superscalar microprocessor as described in claim 43 wherein said first destination register is an 8-bit register and said second destination register is a 32-bit register and wherein said merging means comprises means for generating an enable signal corresponding to said 8-bit register for said second uop if said 32-bit register of said second uop includes said 8-bit register.

49. A superscalar microprocessor as described in claim 43 wherein said first and said second uop have an associated program code order and wherein said priority means comprises means for assigning priority to said first and said second uop based on said program code order.

50. A superscalar microprocessor as described in claim 43 wherein said priority means comprises:
flag priority means for generating explicit write enable signals corresponding to a flag bit of a flag register for said first or said second uop if said first or said second uop explicitly targets said flag bit; and
flag priority means for generating implicit write enable signals corresponding to said flag bit for said first or said second uop if said first or said second uop implicitly targets said flag bit.

51. An apparatus for storing results of an executed set of operations into a register file, said set of operations executed by a superscalar microprocessor, said register file having a plurality of registers and wherein a first register of said registers contains a first portion and a second portion, said apparatus comprising:
merging circuitry for generating a separate enable signal, corresponding to said first portion, for each individual operation of said set of operations that targets said first portion for containing result data or that targets a register portion that includes said first portion for containing result data;
priority circuitry for generating a single write enable signal, corresponding to said first portion, for a highest priority operation of a set of operations having enable signals corresponding to said first portion; and
enable circuitry for steering data of results of said highest priority operation to said first portion of said register file, said enable circuitry coupled to receive said single write enable signal and coupled to said register file; and
wherein said merging circuitry and said priority circuitry are operable to store said results, within one clock cycle, of at least two operations that target portions of a same destination register.

52. An apparatus for storing results of an executed set of operations into said register file as described in claim 51 further comprising:
storage memory for receiving said results of said executed set of operations for storage into said register file, said results comprising, for each operation of said set, a flag field, a destination register field, and a data field, and wherein said first portion is indicated by either said flag field, said destination register field, or both.

53. An apparatus for storing results of an executed set of operations into said register file as described in claim 52 further comprising event logic circuitry for generating individual guarantee bits for individual operations of said executed set of operations, said guarantee bits indicating that a particular operation is guaranteed to write results into said register file and wherein said priority circuitry includes circuitry for ignoring priority of individual operations of said executed set of operations if an associated guarantee bit is not asserted, said priority circuitry coupled to said event logic circuitry to receive said guarantee bits.

54. An apparatus for storing results of a set of operations, said set of operations executed by a superscalar processor, said apparatus comprising:
   a destination register of a register file, said destination register comprising separately accessible destination register portions wherein at least one of said separately accessible destination register portions overlap and wherein one of said separately accessible destination register portions includes an entirety of said destination register;
   a memory for containing a result for each operation of said executed set of operations and also for containing a designation of a destination register portion for each result;
   merging circuitry coupled to receive information from said memory, said merging circuitry for merging different destination register portions of a same destination register into said destination register of said register file; and
   priority circuitry for writing results of a highest priority operation to a first destination register portion wherein said set of operations comprises a low priority operation and said highest priority operation and wherein said low priority operation and said highest priority operation both target said first destination register portion for writing results therein;
   wherein said merging circuit and priority circuit are operable to write said results of said set of operations into said register file within a single clock cycle.

55. An apparatus as described in claim 54 wherein said memory contains, for each operation of said set of operations, a flag field; a destination register field; and a data field, wherein said first destination register portion is indicated by either said flag field, said destination register field, or both.

56. An apparatus for storing results of an executed set of operations into said register file as described in claim 55 further comprising event logic circuitry for generating individual guarantee bits for individual operations of said set of operations, said guarantee bits indicating that a particular operation is guaranteed to write results into said register file and wherein said priority circuitry includes circuitry for ignoring priority of individual operations of said set of operations if an associated guarantee bit is not asserted, said priority circuitry coupled to said event logic circuitry to receive said guarantee bits.

* * * * *